US012696829B2

(12) United States Patent
Arnett et al.

(10) Patent No.: US 12,696,829 B2
(45) Date of Patent: Aug. 4, 2026

(54) TILLAGE IMPLEMENT WITH VISION SENSORS

(71) Applicant: Great Plains Manufacturing, Inc., Salina, KS (US)

(72) Inventors: Gregory W. Arnett, Garden City, MO (US); James Edward Schott, McPherson, KS (US); Paul Harold Haggard, Iowa City, IA (US); Matthew D. Goodon, Salina, KS (US); Michael Ohnsat, Tipton, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 603 days.

(21) Appl. No.: 18/298,111

(22) Filed: Apr. 10, 2023

(65) Prior Publication Data

US 2023/0240165 A1 Aug. 3, 2023

Related U.S. Application Data

(63) Continuation of application No. 16/871,940, filed on May 11, 2020, now Pat. No. 11,622,494.
(Continued)

(51) Int. Cl.
*A01B 63/00* (2006.01)
*A01B 79/00* (2006.01)
(Continued)

(52) U.S. Cl.
CPC ............ *A01B 63/008* (2013.01); *A01C 5/062* (2013.01); *A01C 7/203* (2013.01); *A01B 79/005* (2013.01); *A01B 79/02* (2013.01); *A01C 5/066* (2013.01)

(58) Field of Classification Search
CPC ..... A01B 63/008; A01B 63/002; A01B 63/00; A01B 79/005; A01B 79/00; A01B 79/02;
(Continued)

(56) References Cited

U.S. PATENT DOCUMENTS

| | | | |
|---|---|---|---|
| 6,596,996 | B1 | 7/2003 | Stone et al. |
| 6,853,937 | B2 | 2/2005 | Shibusawa et al. |

(Continued)

FOREIGN PATENT DOCUMENTS

| | | | |
|---|---|---|---|
| CA | 2947227 | A1 | 7/2017 |
| CA | 3001195 | A1 * | 1/2019 ........... A01C 21/005 |

(Continued)

OTHER PUBLICATIONS

Russian Office Action dated Oct. 9, 2023 for related Russian Patent Application No. 2021134725, 11 pages.
(Continued)

*Primary Examiner* — Christopher J. Novosad
(74) *Attorney, Agent, or Firm* — Hovey Williams LLP; Kameron D. Kelly

(57) ABSTRACT

A control system for a tillage implement broadly includes front and rear sensors, a leveling assembly, and a controller. The front sensor is positioned on a front of a central section, wherein the front sensor is configured to obtain height information indicative of a height of the front of the central section above a ground. The rear sensor is positioned on a rear of the central section, wherein the rear sensor is configured to obtain height information indicative of a height of the rear of the central section above the ground. The leveling assembly is configured to adjust a front to rear orientation of the central section. The controller is configured to receive the height information from the front sensor and the height information from the rear sensor, and to provide instructions to the leveling assembly to adjust the
(Continued)

front to rear orientation of the central section based on the received height information.

26 Claims, 17 Drawing Sheets

Related U.S. Application Data

(60) Provisional application No. 62/985,989, filed on Mar. 6, 2020, provisional application No. 62/846,165, filed on May 10, 2019.

(51) Int. Cl.
 *A01B 79/02* (2006.01)
 *A01C 5/06* (2006.01)
 *A01C 7/20* (2006.01)

(58) Field of Classification Search
 CPC .. A01C 5/062; A01C 5/06; A01C 5/00; A01C 7/203; A01C 7/201; A01C 7/20; A01C 7/00
 See application file for complete search history.

(56) References Cited

U.S. PATENT DOCUMENTS

| | | | |
|---|---|---|---|
| 8,365,679 | B2 | 2/2013 | Landphair et al. |
| 8,418,636 | B2 | 4/2013 | Liu et al. |
| 8,862,339 | B2 | 10/2014 | Henry et al. |
| 8,909,436 | B2 | 12/2014 | Achen et al. |
| 8,930,095 | B2 | 1/2015 | Anderson |
| 8,935,986 | B2 | 1/2015 | Blomme et al. |
| 9,026,321 | B2 | 5/2015 | Henry et al. |
| 9,282,688 | B2 | 3/2016 | Casper et al. |
| 9,282,693 | B2 | 3/2016 | Anderson |
| 9,405,039 | B2 | 8/2016 | Anderson |
| 9,474,999 | B2 | 10/2016 | Fan |
| 9,516,796 | B2 | 12/2016 | Sudbrink et al. |
| 9,554,098 | B2 | 1/2017 | Casper et al. |
| 9,576,215 | B2 | 2/2017 | Wilson et al. |
| 9,585,307 | B2 | 3/2017 | Holland |
| 9,675,004 | B2 | 6/2017 | Landphair et al. |
| 9,717,171 | B2 | 8/2017 | Redden et al. |
| 9,743,574 | B1 | 8/2017 | Maxton et al. |
| 9,743,578 | B2 | 8/2017 | Blomme et al. |
| 9,891,155 | B2 | 2/2018 | Eising |
| 9,961,823 | B2 | 5/2018 | Sporrer et al. |
| 10,098,273 | B2 | 10/2018 | Redden et al. |
| 10,104,827 | B2 | 10/2018 | Adamchuk et al. |
| 10,123,475 | B2 | 11/2018 | Posselius et al. |
| 10,143,128 | B2 | 12/2018 | Landphair et al. |
| 10,172,289 | B2 | 1/2019 | Briquet-Kerestedjian et al. |
| 10,219,430 | B2 | 3/2019 | Blomme et al. |
| 10,223,588 | B2 | 3/2019 | Wilson et al. |
| 10,225,983 | B2 | 3/2019 | Kovach |
| 10,231,376 | B1 | 3/2019 | Stanhope et al. |
| 10,251,328 | B2 | 4/2019 | Gerber et al. |
| 10,262,206 | B2 | 4/2019 | Posselius |
| 10,262,413 | B2 | 4/2019 | Strnad et al. |
| 10,276,037 | B2 | 4/2019 | Meiners |
| 10,321,623 | B1 | 6/2019 | Maxton et al. |
| 10,327,374 | B2 | 6/2019 | Achen et al. |
| 10,342,171 | B2 | 7/2019 | Knobloch et al. |
| 10,405,480 | B2 | 9/2019 | Blunier et al. |
| 10,412,877 | B2 | 9/2019 | Barrick et al. |
| 10,412,878 | B2 | 9/2019 | Karstens et al. |
| 10,420,272 | B2 | 9/2019 | Kovach |
| 10,440,876 | B2 | 10/2019 | Sporrer et al. |
| 10,448,554 | B2 | 10/2019 | Gerber et al. |
| 10,485,155 | B2 | 11/2019 | Henry |
| 10,492,353 | B2 | 12/2019 | Kovach et al. |
| 10,517,238 | B2 | 12/2019 | Sporrer et al. |
| 10,561,052 | B2 | 2/2020 | Barrick et al. |
| 10,561,056 | B2 | 2/2020 | Peterson et al. |
| 10,667,454 | B2 | 6/2020 | Sporrer et al. |
| 2010/0322477 | A1 | 12/2010 | Schmitt et al. |
| 2015/0015697 | A1 | 1/2015 | Redden et al. |
| 2015/0094917 | A1 | 4/2015 | Blomme et al. |
| 2015/0278173 | A1 | 10/2015 | Deng |
| 2015/0305224 | A1 | 10/2015 | Casper et al. |
| 2017/0112043 | A1 | 4/2017 | Nair et al. |
| 2017/0223947 | A1 | 8/2017 | Gall et al. |
| 2017/0251587 | A1 | 9/2017 | Sporrer et al. |
| 2018/0049361 | A1 | 2/2018 | Zemenchik |
| 2018/0124991 | A1 | 5/2018 | Knobloch |
| 2018/0139892 | A1 | 5/2018 | Knobloch et al. |
| 2018/0139893 | A1 | 5/2018 | Baurer et al. |
| 2018/0153088 | A1 | 6/2018 | Sporrer et al. |
| 2018/0206393 | A1 | 7/2018 | Stoller et al. |
| 2018/0210450 | A1 | 7/2018 | Ferrari et al. |
| 2018/0220574 | A1 | 8/2018 | Peterson et al. |
| 2018/0279542 | A1 | 10/2018 | Kovach |
| 2018/0279543 | A1 | 10/2018 | Kovach |
| 2018/0310466 | A1 | 11/2018 | Kovach et al. |
| 2019/0008088 | A1 | 1/2019 | Posselius et al. |
| 2019/0014715 | A1 | 1/2019 | Becker et al. |
| 2019/0098824 | A1 | 4/2019 | Kovach |
| 2019/0116716 | A1 | 4/2019 | Henry |
| 2019/0126912 | A1 | 5/2019 | Peterson et al. |
| 2019/0166762 | A1 | 6/2019 | Wu et al. |
| 2019/0174666 | A1 | 6/2019 | Manternach |
| 2019/0183030 | A1 | 6/2019 | Sporrer et al. |
| 2019/0235529 | A1 | 8/2019 | Barrick et al. |
| 2019/0236359 | A1 | 8/2019 | Posselius |
| 2019/0320574 | A1 | 10/2019 | Andrejuk et al. |
| 2019/0343032 | A1 | 11/2019 | Stanhope |
| 2019/0357416 | A1 | 11/2019 | Hughes |
| 2019/0377986 | A1 | 12/2019 | Ferrari et al. |
| 2019/0387658 | A1 | 12/2019 | Henry |
| 2019/0392269 | A1 | 12/2019 | Ferrari et al. |
| 2020/0002948 | A1 | 1/2020 | Van Giesen et al. |
| 2020/0045868 | A1 | 2/2020 | Wu et al. |
| 2020/0045870 | A1 | 2/2020 | Stovall et al. |
| 2020/0053941 | A1 | 2/2020 | Sporrer et al. |
| 2020/0053942 | A1 | 2/2020 | Kilby et al. |
| 2020/0053943 | A1 | 2/2020 | Becker et al. |
| 2020/0053945 | A1 | 2/2020 | Becker et al. |
| 2020/0053946 | A1 | 2/2020 | Ruckle et al. |

FOREIGN PATENT DOCUMENTS

| | | | |
|---|---|---|---|
| DE | 102017116633 | A1 | 1/2019 |
| EP | 3357316 | A1 | 8/2018 |
| EP | 3395133 | A1 | 10/2018 |
| EP | 3395135 | A1 | 10/2018 |
| EP | 3400764 | A1 | 11/2018 |
| EP | 3403478 | B1 | 11/2018 |
| EP | 3406124 | A1 | 11/2018 |
| RU | 2119733 | | 10/1998 |
| RU | 2311010 | | 11/2007 |
| RU | 2654725 | | 5/2018 |
| WO | 2019123040 | A1 | 6/2019 |
| WO | 2019123042 | A1 | 6/2019 |

OTHER PUBLICATIONS

Search Report and Written Opinion dated Oct. 15, 2020 for related PCT Application No. PCT/US2020/032360, filed May 11, 2020, 13 pages.
Search Report and Written Opinion dated May 25, 2023 for related EP Patent Application No. 20805223.3, filed Dec. 10, 2021, 7 pages.

\* cited by examiner

| Furrow | 40 |
|---|---|
| Width avg | 1.25 " |
| Depth avg | 2.0 " |
| Quality avg | Good |
| - Collapsing | No |
| - Shape | Good |
| Seed | |
| Skips avg | 1.8 % |
| Doubles avg | 0.7 % |
| Depth avg | 1.75 " |
| Spacing avg | 6.75 " |
| Depth [1] | 1.9 " |
| Spacing [1] | 7.2 " |

Profile Shape

Depth: 2.0"

Width 1.25 "

| Furrow | |
|---|---|
| Width avg | 3.0 " |
| Depth avg | 2.0 " |
| Quality avg | Ok |
| - Collapsing | No |
| - Shape | Ok |
| Seed | |
| Skips avg | 1.8 % |
| Doubles avg | 0.7 % |
| Depth avg | 1.75 " |
| Spacing avg | 6.75 " |
| Depth [1] | 1.9 " |
| Spacing [1] | 7.2 " |

TILLAGE IMPLEMENT WITH VISION SENSORS

CROSS-REFERENCE TO RELATED APPLICATIONS

This application is a continuation patent application of U.S. application Ser. No. 16/871,940, filed May 11, 2020, entitled TILLAGE IMPLEMENT WITH VISION SENSORS, which claims the benefit of U.S. Provisional Application Ser. No. 62/985,989, filed Mar. 6, 2020, entitled VISION SENSORS FOR AGRICULTURAL IMPLEMENTS AND PROCESSES, and U.S. Provisional Application Ser. No. 62/846,165, filed May 10, 2019, entitled AGRICULTURAL VISION SENSORS, each of which is hereby incorporated in its entirety by reference herein.

BACKGROUND

1. Field

The present invention relates generally to agricultural implements. More specifically, embodiments of the present invention concern agricultural implements that use visions sensors.

2. Discussion of Prior Art

Agricultural seeders and planters are well known for distributing crop seeds uniformly along a field. Conventional seeders and planters are configured to deposit rows of seed in a single pass by opening a series of furrows, depositing seed in the furrows, and then closing the furrows. It is customary for such prior art machines to have a series of openers to form the furrows and deposit seed. Such machines also include seed metering devices to dispense seed to the openers at a predetermined rate, and the seeds may be dispensed in a singulated or non-singulated manner. It is known in the art for conventional planters to be configured for planting seeds so that a predetermined number of seeds are planted per foot or per acre.

However, conventional seeding and planting equipment have various disadvantages. Prior art seeding and planting implements are generally prone to inaccurate dispensing of seed and to other types of operating failures. Passive methods are used for setting seed spacing and improving seed settling in the furrow. For instance, mechanical seed metering devices are known for passively setting a seed spacing by mechanically metering seed and dropping seed toward a furrow. However, such mechanical devices are inaccurate due to wear and/or failure of mechanical components. It is also known to use sensors to count seeds that are advanced toward a furrow. However, conventional sensor arrangements in air seeders are unable to accurately count seed that recirculates past the sensor. Known sensors detect seeds that are being transferred from a metering device to the soil and infer the final spacing based on what is detected as they are transferred. It is known that some seeds will roll or bounce as they transition from the transferring device and enter the soil furrow. However, prior art sensors are unable to sense or capture the effect of roll or bounce on final seed location.

Known agricultural tillage implements include one or more ground-engaging tools supported by and extending down from a frame to engage the ground during tilling operations. Conventional tillage implements have adjustable wheels that are adjusted by a hydraulic actuator to shift the wheels vertically with respect to the frame.

Prior art tillage implements, particularly when used prior to seeding or planting, are problematic for a number of reasons. For example, conventional tillage systems are unable to measure or otherwise determine the amount of plant material residue covering the ground where the tillage implement has passed. Known tillage systems also do not measure tillage conditions, such as tillage depth or soil quality, where the tillage implement has passed. These systems are also unable to use such data to adjust tillage implement settings during tilling operations.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide an implement that does not suffer from the problems and limitations of prior art devices, including those set forth above.

A first aspect of the present invention concerns a control system for a tillage implement configured to till ground, wherein the tillage implement includes a central section. The control system broadly includes front and rear sensors, a leveling assembly, and a controller. The front sensor is positioned on a front of the central section, wherein the front sensor is configured to obtain height information indicative of a height of the front of the central section above a ground. The rear sensor is positioned on a rear of the central section, wherein the rear sensor is configured to obtain height information indicative of a height of the rear of the central section above the ground. The leveling assembly is configured to adjust a front to rear orientation of the central section. The controller is configured to receive the height information from the front sensor and the height information from the rear sensor, and to provide instructions to the leveling assembly to adjust the front to rear orientation of the central section based on the received height information.

A second aspect of the present invention concerns a method of operating a tillage implement configured to till ground, wherein the tillage implement includes a central section. The method includes the steps of obtaining, via a front sensor positioned on a front of the central section, height information indicative of a height of the front of the central section above the ground; obtaining, via a rear sensor positioned on a rear of the central section, height information indicative of a height of the rear of the central section above the ground; comparing, via a controller, the height of the front of the central section with the height of the rear of the central section; and providing instructions to a leveling assembly associated with the central section to adjust a front to rear orientation of the central section based on the comparison performed in step (c).

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figures 1, 1A:
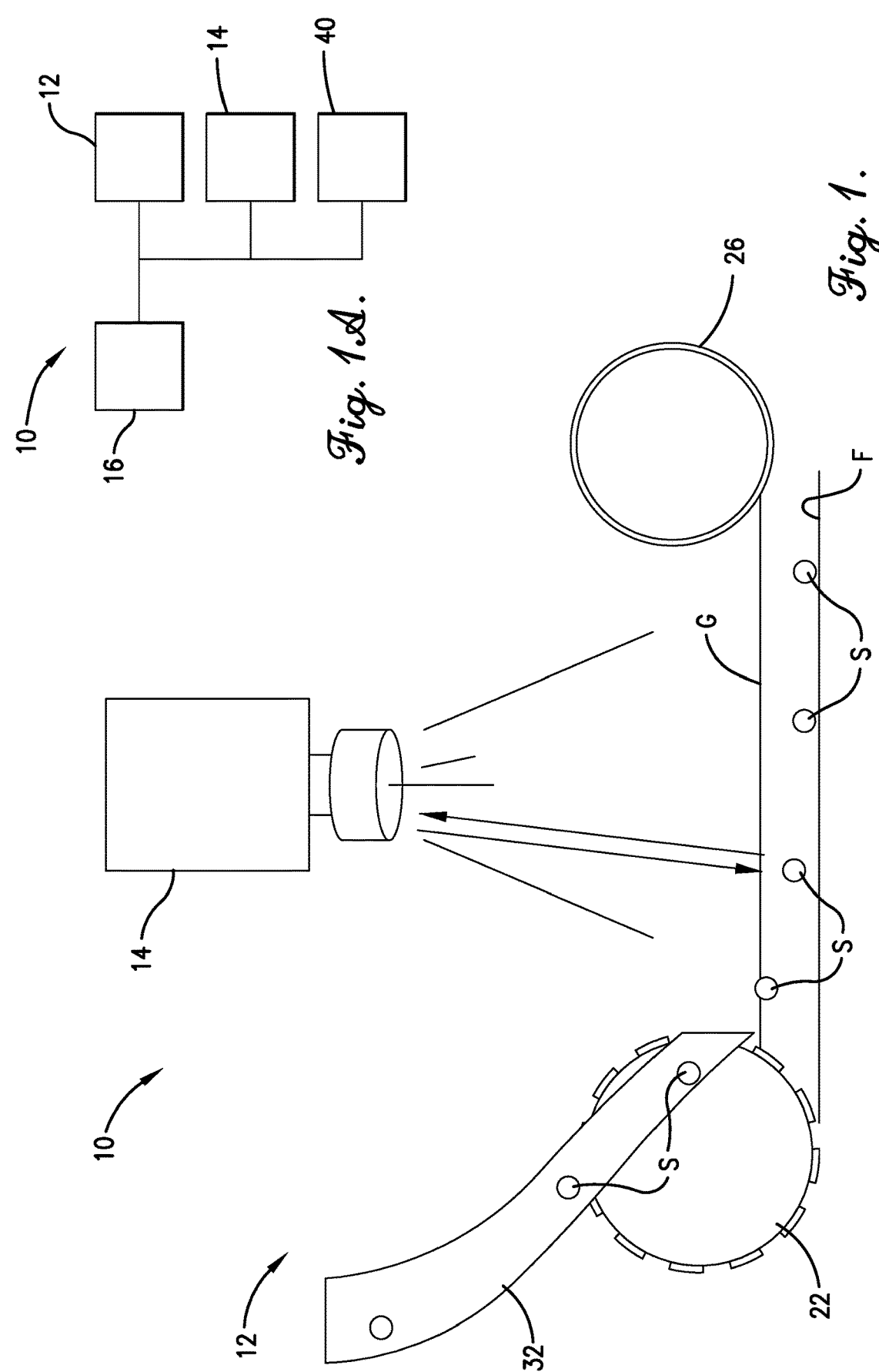
FIG. 1 is a fragmentary schematic elevational view of a seeding implement constructed in accordance with a first preferred embodiment of the present invention, showing an opener assembly used to deposit seed into a furrow via a seed tube, and a time-of-flight sensor to obtain information about the deposited seed.
FIG. 1A is a schematic view of the seeding implement shown in FIG. 1, showing a controller operably coupled to the opener assembly and the sensor.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Seeding Implement

Turning initially to FIG. 1, an agricultural seeding implement 10 is configured to deposit seeds S into a series of furrows F formed in the ground G and extending uniformly along a field. The seeding implement may be configured to deposit a variety of crop seeds and may take different forms of agricultural seeders, planters, and/or drills. Embodiments of the seeding implement 10 may also be configured to deposit seeds at different planting depths and/or spacing.

The seeding implement 10 may be pulled across a field (which may include one or more sections of soil) to deposit seed within furrows. The implement 10 is preferably advanced by a towing vehicle (not shown) such as a tractor. In various embodiments, the towing vehicle may include an operator-driven vehicle or an autonomous vehicle for advancing the implement. In general, embodiments of the implement are preferably towed behind the vehicle, although features of the implement may be alternatively located relative to the vehicle (e.g., to one side of the vehicle or in front of the vehicle).

In the depicted embodiment, the seeding implement 10 preferably includes, among other things, a main frame (not shown), an opener assembly 12, a time-of-flight sensor 14, and a controller 16 (see FIGS. 1 and 1A). Although not depicted, the seeding implement 10 preferably includes a plurality of opener assemblies 12 spaced laterally along a width of the seeding implement 10. Each opener assembly 12 preferably has at least one corresponding time-of-flight sensor 14 associated therewith.

Directional terms used in the specification, such as the terms "front/forward," "back/rear/rearward," "left," and "right," are given from the viewpoint of one standing at the rear of the implement looking forward. As such, for example, the implement may include a hitch tongue (not shown) at a front of the implement, extending forward from the main frame, for coupling the implement with the towing vehicle. Furthermore, the implement will generally be configured for movement in a forward travel direction, as the implement is propelled by a towing vehicle. As used herein, the term "longitudinal" will generally refer to a forward and/or rearward direction with respect to the implement. As such, the longitudinal direction is generally parallel with the travel direction. In contrast, the term "lateral" will generally refer to a rightward and/or leftward direction with respect to the implement. As such, the lateral direction is generally perpendicular with the travel direction.

Turning to FIGS. 1-6, the seeding implement 10 preferably includes a plurality of opener assemblies 12. In particular, each opener assembly 12 is preferably attached to a laterally extending toolbar (not shown) of the main frame. In the illustrated embodiment, each opener assembly 12 preferably includes an opener frame 20, an opener 22, firmer tail 24, closing wheels 26, and a seed distribution element 28 (see FIG. 2).

Embodiments of the opener 22 preferably include a pair of coulter blades 30 rotatably supported by the opener frame 20 and configured to create the furrow F in the ground G. It will be understood that the coulter blades may be variously configured to form the furrow F.

Figure 3:
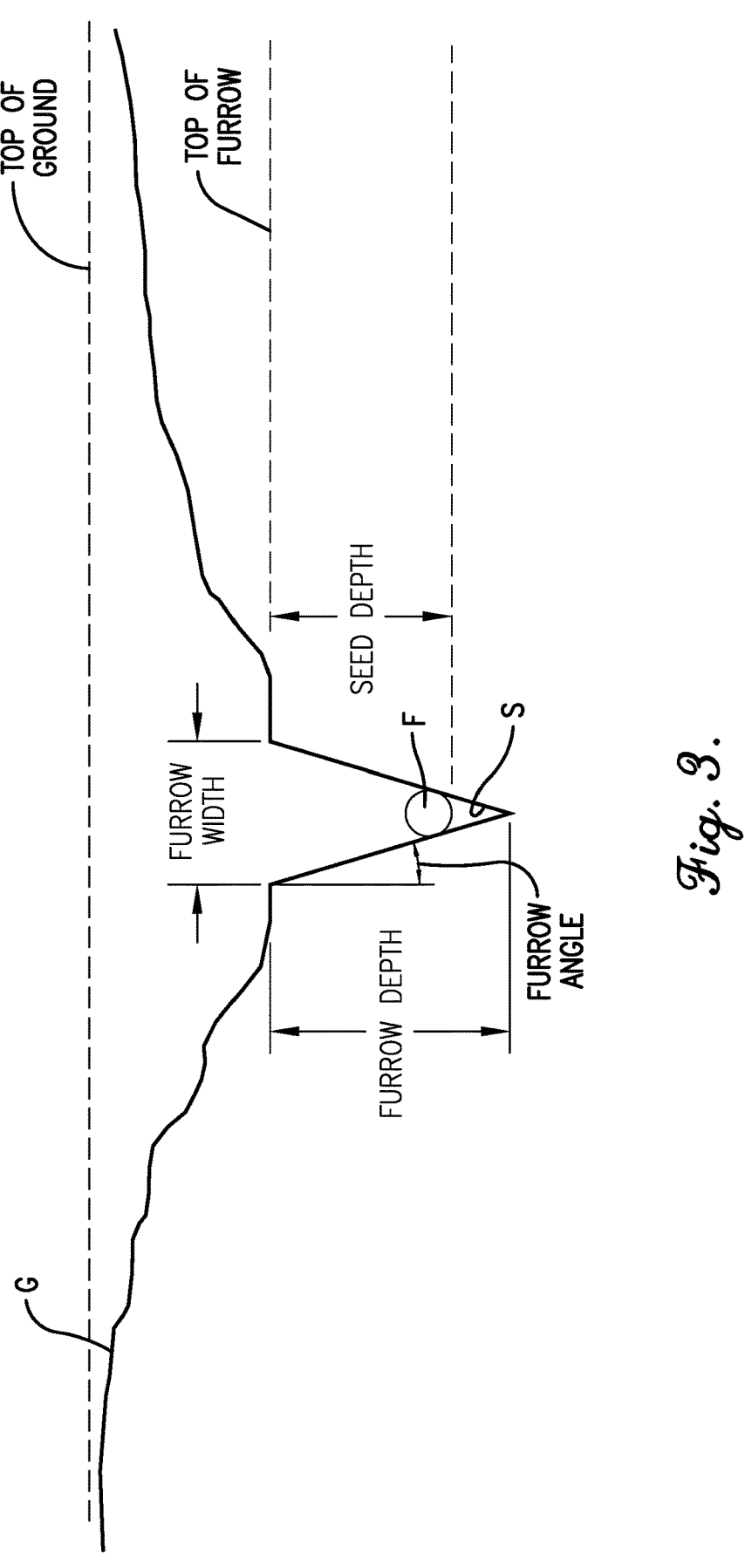
FIG. 3 is a schematic front cross-sectional view of the furrow shown in FIGS. 1-2A, showing the furrow profile shape, including the furrow width, furrow depth, and furrow angle, and also showing the seed depth.
Figure 4:
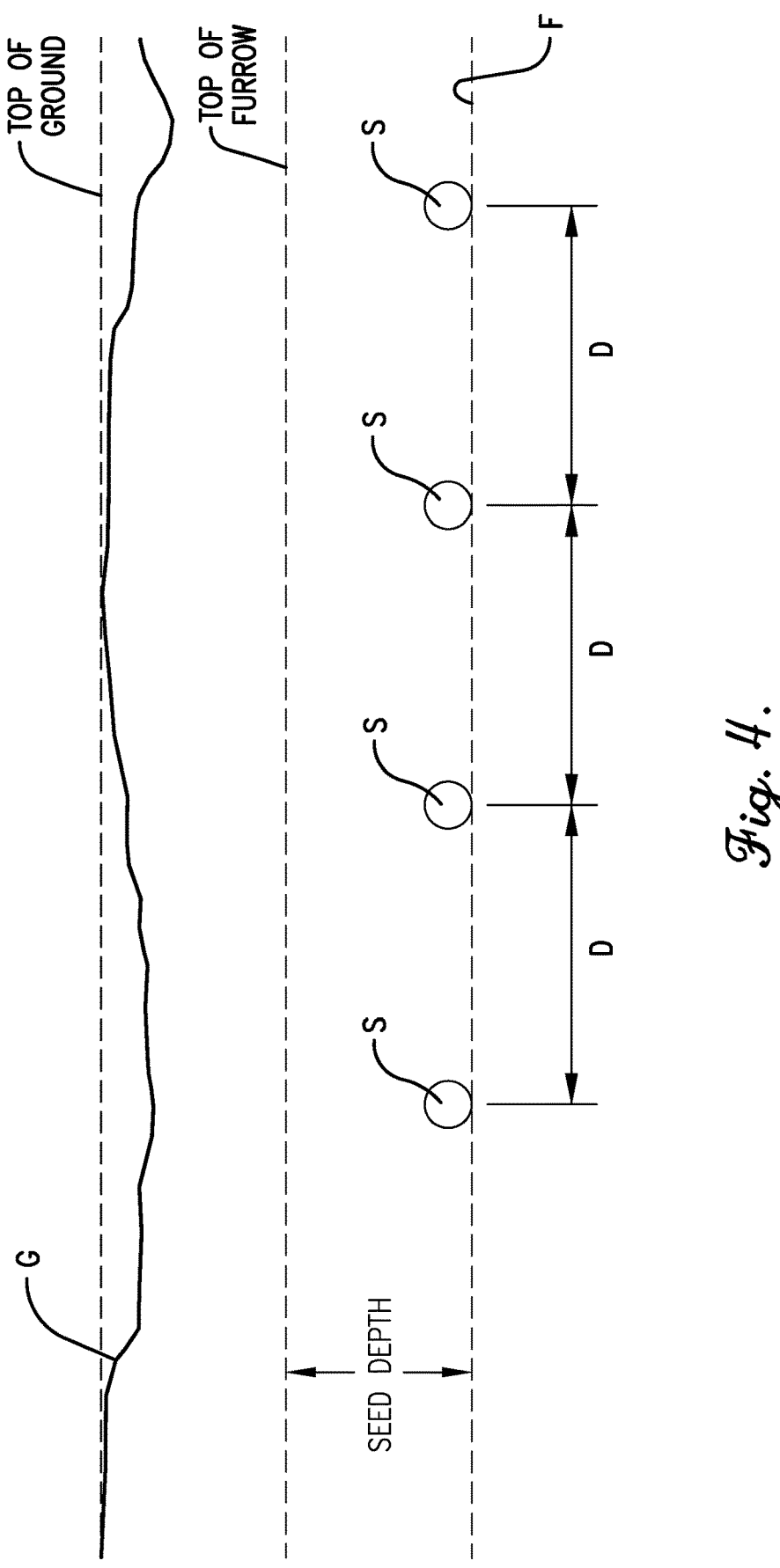
FIG. 4 is a schematic side cross-sectional view of the furrow shown in FIGS. 1-3, showing the seed spacing measured along the length of the furrow between adjacent seeds.

The seeding implement 10 is preferably operable to set, among other things, the position of the coulter blades 30 and closing wheels 26 to form a desired furrow width and furrow depth and provide a corresponding seed depth (see FIG. 3). One or more other seeding implement settings may also be adjustable to control aspects of a desired furrow cross-sectional profile shape, such as the furrow angle (see FIG. 3). As will be explained, the seeding implement 10 is preferably configured to monitor the furrow width, furrow depth, and/or furrow profile shape.

Figure 1B:
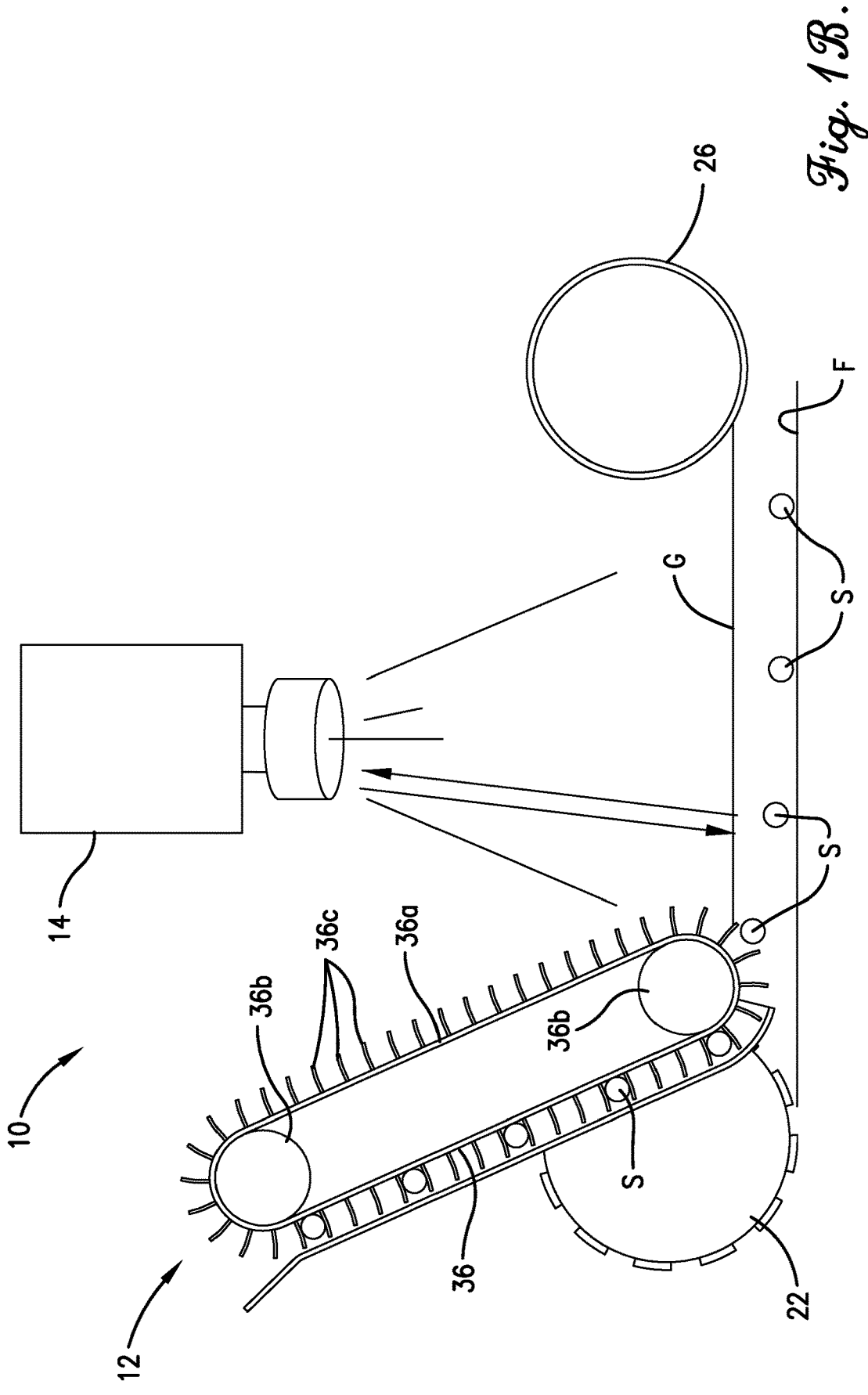
FIG. 1B is a fragmentary schematic elevational view of an alternative seeding implement similar to FIG. 1, but showing the seed tube replaced with a delivery conveyor that carries seed to the furrow.

The seed distribution element 28 is configured to deposit seeds S into the furrow F and preferably includes a seed tube 32 adjacent the coulter blades 30. In the usual manner, the seed tube 32 presents an outlet 34 located laterally between the coulter blades 30 so that seeds S are directed into the furrow F. However, it is within the ambit of at least some aspects of the present invention for the seeding implement to have an alternative seed distribution device. For instance, as depicted in FIG. 1B, the seeding element 10 may have a delivery conveyor assembly 36 that carries seed to the furrow. The delivery conveyor assembly 36 includes an endless conveyor 36a operably supported by conveyor wheels 36b. Preferably, the endless conveyor 36a has a series of conveyor elements 36c that engage the seed. The endless conveyor 36 is operable to be advanced to drop or fling the seed into the furrow.

The seeding implement 10 is preferably configured with seed metering equipment (not shown) to adjustably set the rate of seeds S deposited from the seed tube 32. Embodiments of the seeding implement are preferably configured to deposit singulated seeds having a predetermined seed spacing dimension D, which is defined between adjacent pairs of seeds S (see FIG. 4). It will also be understood that seeding implement embodiments may be operable to dispense non-singulated groups of seeds.

Although not shown, embodiments of the seeding implement may have a distribution element configured to deposit other seed-like objects (such as fertilizer pellets, pesticide pellets, or nutrient pellets) into the furrow. For example, a fertilizer tube may be provided with a configuration and/or position similar to the seed tube for directing fertilizer pellets into the furrow. The implement may be configured so that the rate of fertilizer pellets (or other non-seed objects) deposited from the distribution element is adjustable.

Sensors

The seeding implement 10 preferably includes at least one time-of-flight sensor 14 associated with the opener assembly 12. Specifically, embodiments of the present invention may use a sensor 14, such as a camera, capable of obtaining and/or performing depth measurements associated with the furrow F, seed S deposited in the furrow F, and/or other non-seed objects deposited along the furrow F.

Figure 2:
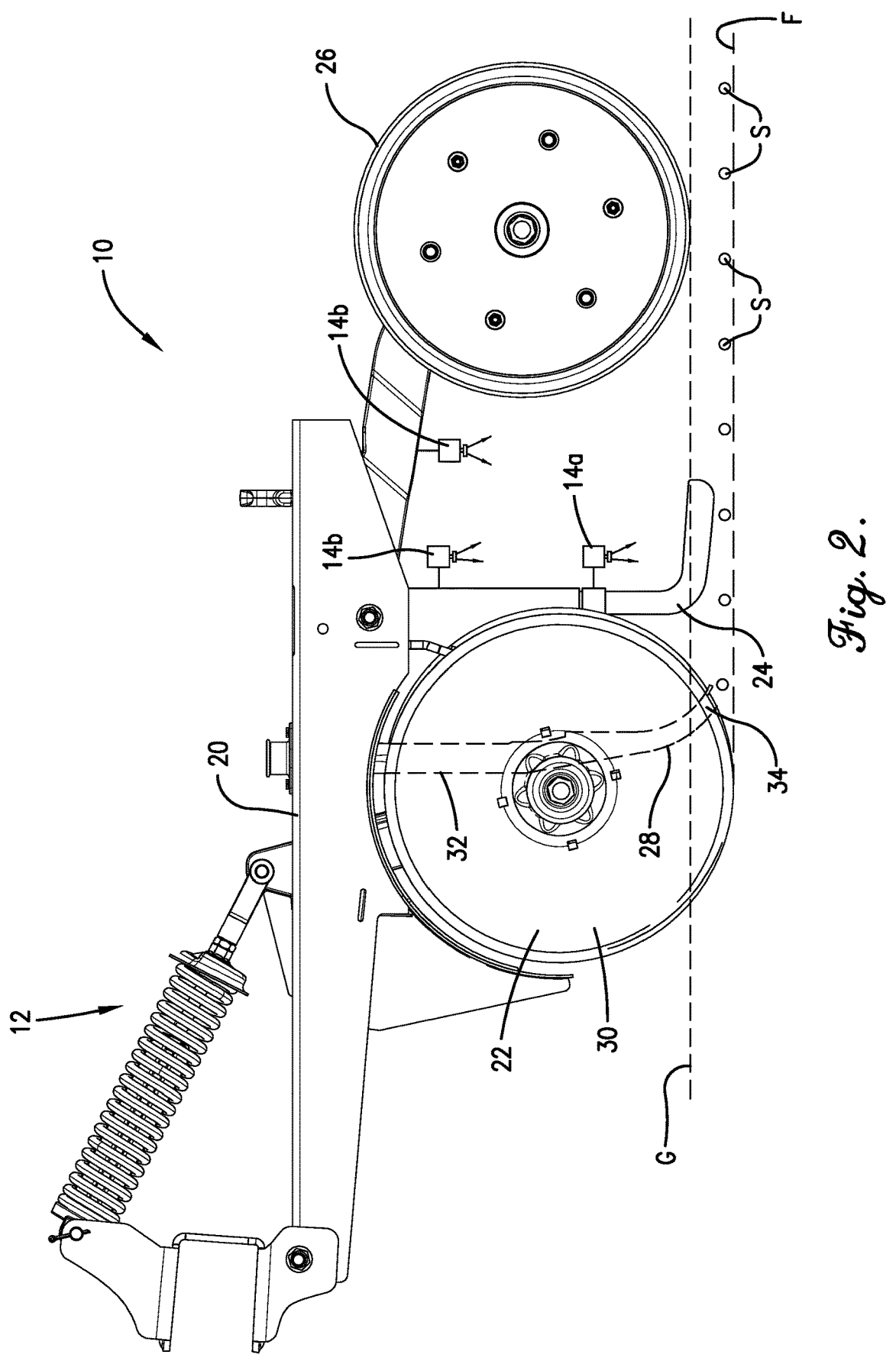
FIG. 2 is a fragmentary elevational view of the seeding implement shown in FIGS. 1, 1A, and 1B, showing a frame, coulter blades, and closing wheels of a seeder assembly, and depicting locations for mounting the sensor above the furrow.

Turning to FIG. 2, in the depicted embodiment, a preferred time-of-flight sensor 14a is preferably positioned between the closing wheel and the coulter blade. In particular, the time-of-flight sensor 14a is mounted on the firmer tail 24 at a location behind the coulter wheels 30.

As depicted in FIG. 2, it is also within the scope of the present invention for one or more time-of-flight sensors 14b to be positioned at alternative locations to obtain and/or perform depth measurements of the furrow, seed, etc. For instance, one or more time-of-flight sensors 14b may be supported relative to the opener frame 20 at alternative positions between the coulter blade and closing wheel (see FIG. 2).

It is contemplated that the preferred opener assembly 12 may be associated with a single time-of-flight sensor 14, which may be located at one of the illustrated positions, or at another position relative to the opener frame 20. However, for at least some aspects of the present invention, the opener assembly 12 may have multiple sensors 14 supported relative to the opener frame 20 for obtaining measurements of the furrow, seed, etc. Multiple sensors 14 may be located at respective ones of the illustrated positions or other positions relative to the opener frame 20. It will be understood that the orientation of each sensor 14 may differ among the various sensor positions, e.g., to optimize monitoring of the furrow and/or seed.

Figure 2A:
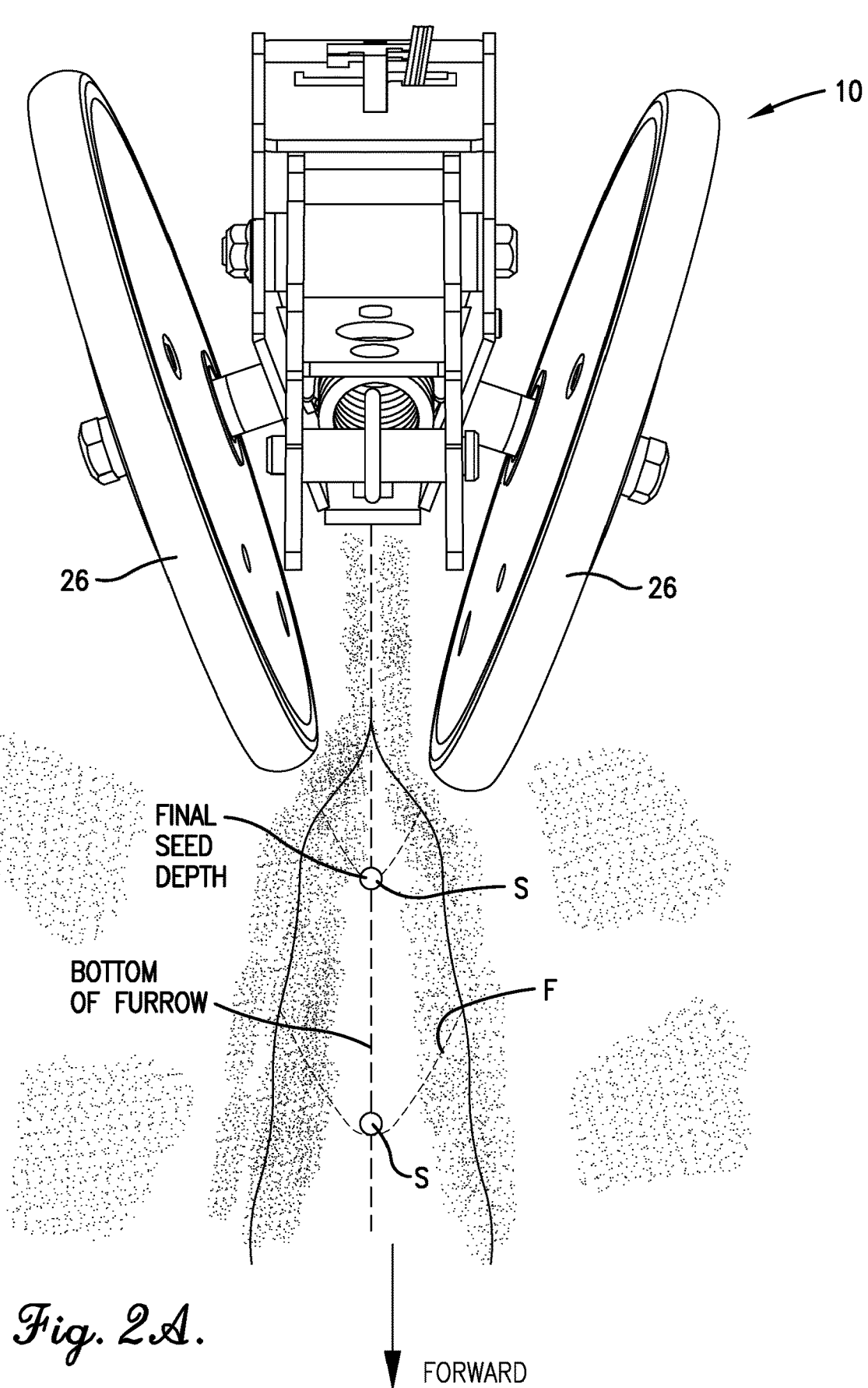
FIG. 2A is a fragmentary perspective of the seeding implement shown in FIGS. 1-2, looking in a rearward direction to show seed within the furrow and the furrow being closed over the seed.

Each time-of-flight sensor 14 is preferably configured to obtain information indicative of one or more furrow parameters of the furrow F. In addition, each time-of-flight sensor 14 is operable to obtain information indicative of one or more seed parameters of seed S deposited into the furrow F, as will be explained. Within the scope of the present invention, one or more sensors 14 may be oriented to look rearwardly toward the rear of the furrow opening where the furrow is closed over the seed S, and such a rearward view is illustrated in FIG. 2A. This rearward orientation of the sensor 14 permits the sensor 14 to see the seed S as it is covered with soil and to accurately determine the seed depth within the furrow F below the finished surface grade.

In preferred embodiments of the present invention, the time-of-flight sensor 14 may comprise a time-of-flight camera. The time-of-flight camera may preferably use mono-chromatic illumination and/or multi-wavelength illumination. The time-of-flight camera may preferably operate in the UV spectrum, the infrared spectrum, and/or in the visible spectrum. A preferred camera may use LED light sources and/or LASER light sources. A preferred camera may include photo-detection elements.

Embodiments of the present invention may, additionally or alternatively, have time-of-flight sensors 14 that include a sensor comprising an array of sensing pixels to determine the location of objects in 3D space, such as a time-of-flight camera, LiDAR sensors, radar sensors, ultrasonic sensors, and/or sonar sensors. Each time-of-flight sensor 14 is configured to generate time-of-flight images of the furrow F and of the seeds S deposited in the furrow F. Each time-of-flight sensor 14 is further configured to monitor positions of non-seed objects, which may include fertilizer pellets, pesticide pellets, or nutrient pellets.

One or more of the time-of-flight sensors 14 may also include or be associated with an RBG camera configured to obtain RGB images of the seeds and/or of the furrow.

Seed objects may be located in camera images using: (i) human crafted, traditional machine vision algorithms, and (ii) deep-learning, neural network methods of computer-optimized algorithms for object detection. These algorithms are configured to be processed by the controller 16, which may include an electronic control unit (ECU) computer, as described below.

In embodiments of the present invention, the time-of-flight sensor 14 provides a depth camera to determine object location and distance relative to other objects. Object location and distance data from the sensor 14 can be used to build a matrix of depth values corresponding to pixels on the camera array (which is generally known as a depth map). Combining depth cameras with object detection means that the object can be located and measured, providing the parameters shown in FIGS. 5 and 6. Applications include seed counting, seed location measurements during planting process, seed velocity, and impact at soil (e.g., to determine whether the seed bounces and/or lands at a desired location). Furrow depth, width, and angle are all configured to be measured throughout the planting process.

Embodiments of the present invention may utilize near-infrared depth mapping based on time-of-flight to generate feedback for seed planting. The depth maps may be overlaid on RGB camera images to distinguish color and provide more data for improving accuracy. Besides time-of-flight, depth maps can also be generated using stereoscopic images (dual cameras) or structured light can achieve similar results, but time-of-flight may be optimal for the present invention's use cases given the state of current depth camera technology.

Time-of-flight (e.g., LiDAR) ranging technology can be used to gather the spatial data on seeds S during the planting process. The principles of time-of-flight imaging may use either monochromatic or multi-wavelength artificial illumination in the UV through the infrared (IR) range. LASER illumination and LED illumination comprise preferred light sources for depth measurements, and may be used with passive photo-detection sensors. Distances of light-reflective surfaces can be determined by measuring the time between the illuminated source turning on and the delay before reflected light returns to photo-detection sensors, using the speed of light as a fixed reference.

For the depicted sensors 14 and other sensors associated with the present invention, it will be appreciated that dust, particles, and other contaminants may interfere with sensor operation. For instance, foreign particulate matter may come to rest on a camera lens or hover adjacent the lens. It is within the ambit of the present invention for the implement to be provided with a powered pneumatic device operable to clear particulate from the camera lens by directing an airflow at or adjacent the lens.

User Interface and Parameters

Data obtained from the sensors 14 may be used to generate and display one or more furrow parameters. The furrow parameters preferably include one or more of a furrow width, a furrow depth, and/or a furrow quality. The furrow quality may include one or more of the following parameters: furrow angle of a furrow sidewall, furrow shape, and/or furrow collapse (to indicate whether at least part of a furrow sidewall has collapsed).

Figure 5:
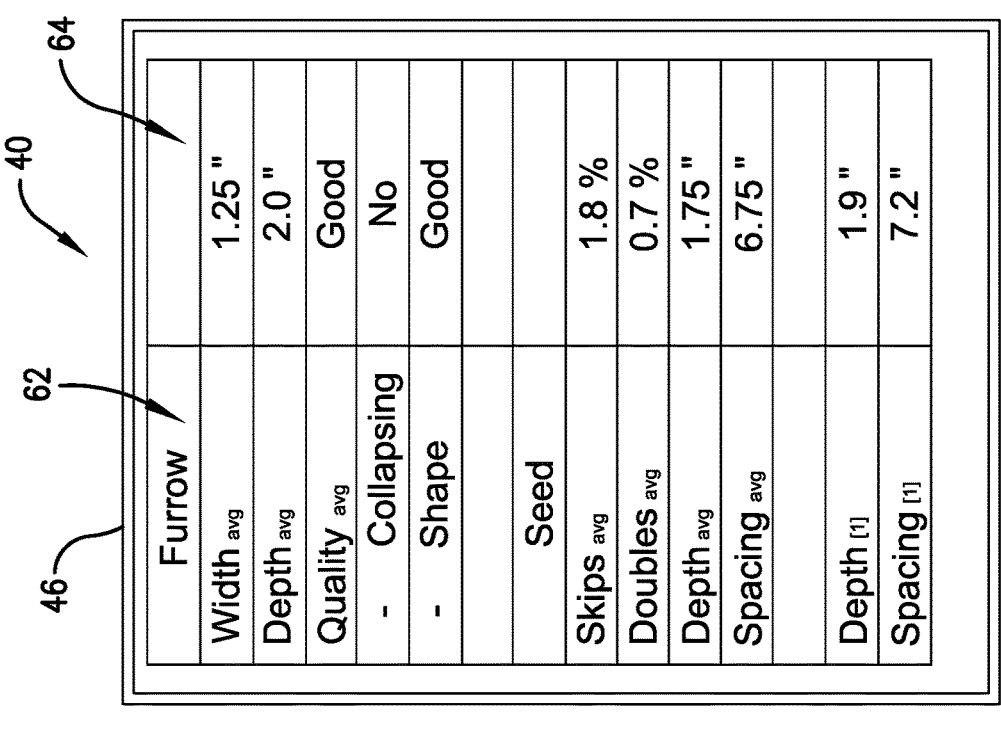
FIG. 5 is a schematic view of a user interface operably associated with the seeding implement to receive information from the sensor, showing a graphical depiction of furrow parameters obtained from the sensor, including furrow width, furrow depth, and furrow profile, and further depicting seed parameters obtained from the sensor including seed skips, seed doubles, seed depth, and seed spacing.
Figure 5:
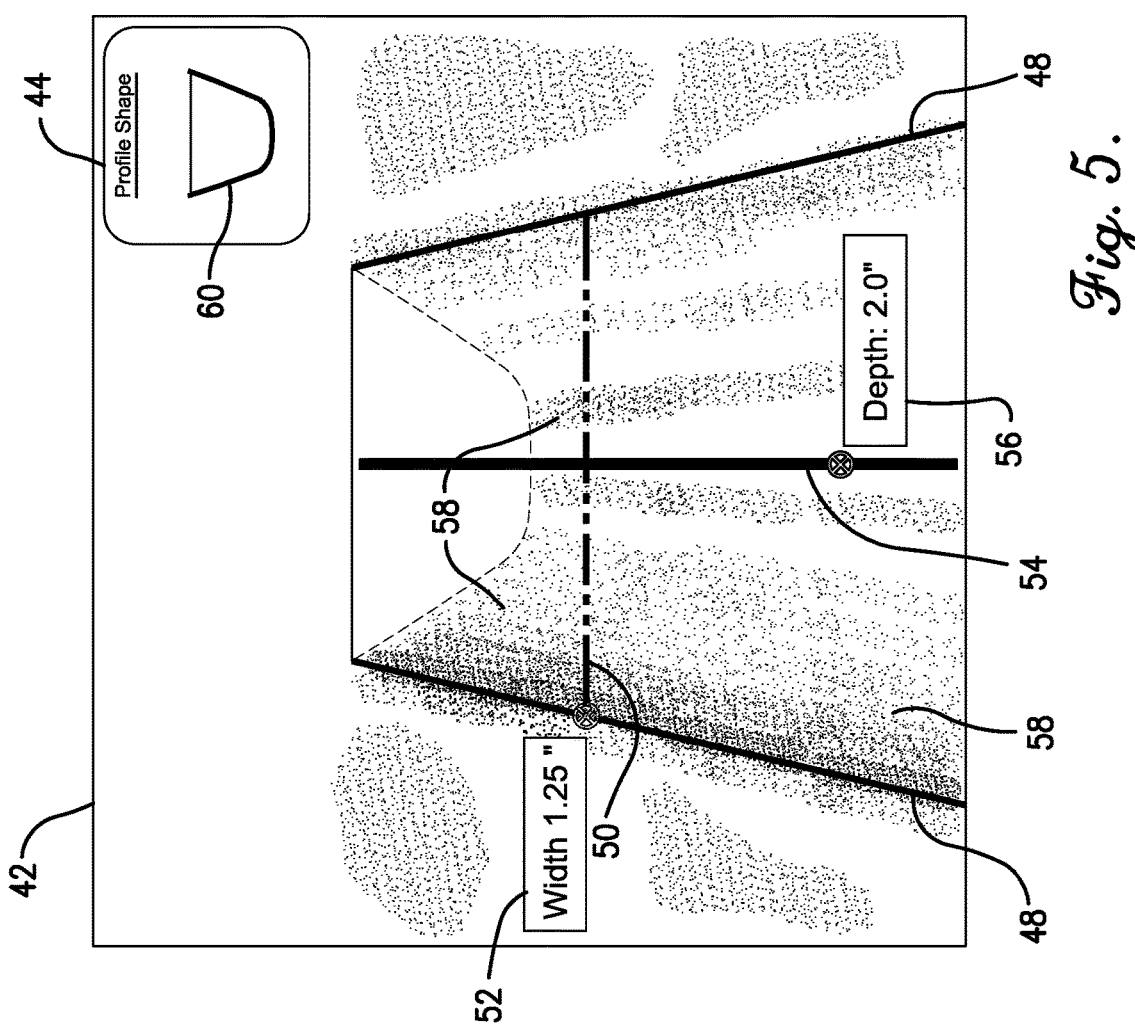
Figure 6:
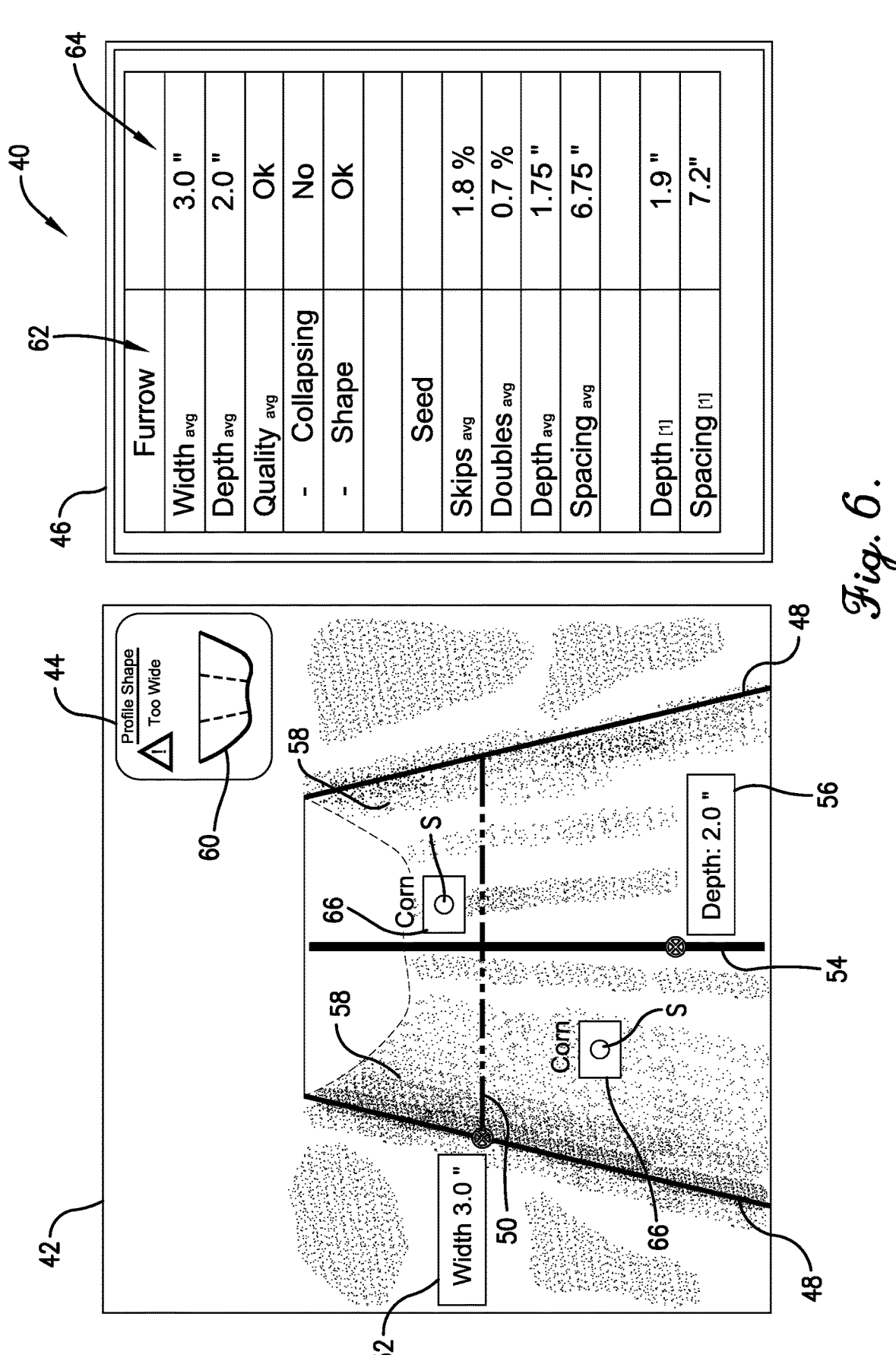
FIG. 6 is a schematic view of the user interface similar to FIG. 5, but with the depicted furrow parameters indicating that the sensed furrow width exceeds maximum target furrow width.

The seeding implement 10 also preferably includes a user interface 40 operably coupled to the controller 16 and configured to display one or more furrow parameters to an operator of the seeding implement (see FIGS. 1, 5 and 6). As will be discussed, an alert may be displayed to the operator (e.g., via the user interface 40) if a furrow parameter exceeds a corresponding target parameter value or range.

The user interface 40 preferably includes a graphical display element 42, a profile shape display element 44, and a data display element 46. The graphical display element 42 is configured to provide a graphical depiction of the measured furrow width. In particular, the measured furrow width is depicted by furrow edge line indicia 48, furrow width line indicia 50, and furrow width data indicia 52. The graphical display element 42 is also configured to provide a graphical depiction of the measured furrow depth. Specifically, the measured furrow depth is depicted by furrow bottom line indicia 54 and furrow depth data indicia 56.

The graphical display element 42 is also preferably configured to display camera image indicia 58 (shown schematically) depicting an image of the furrow, seed, etc. In the depicted embodiment, the graphical display element 42 is configured to overlay the indicia 48,50,52,54,56 on the camera image indicia 58. Preferably, the indicia 48,50,52, 54,56 are configured to be overlaid in association with corresponding features of the furrow in the camera image indicia 58. For instance, the furrow edge line indicia 48 are preferably overlaid on or adjacent to corresponding furrow edges depicted in the camera image indicia 58.

The profile shape display element 44 is configured to provide a graphical depiction of the measured furrow profile, including the furrow sidewalls and the furrow angle. Preferably, the furrow profile is depicted by profile indicia 60. The data display element 46 is configured to provide a list of measured data and includes data label indicia 62 and data indicia 64. The data indicia 64 preferably presents sensor data associated with sensor measurements.

As will be described in more detail below, it is within the scope of the present invention for the controller 16 and user interface 40 to be provided as part of a computing device of the implement 10. All or some components of the computing device may be located in the cab of the towing vehicle or otherwise associated with the towing vehicle.

The preferred user interface 40 will have an electronic display, such as a cathode ray tube, liquid crystal display, plasma, or touch screen that is operable to display visual graphics, images, text, etc. In certain embodiments, the computer program associated with the user interface 40 facilitates interaction and communication through a graphical user interface (GUI) that is displayed via the electronic display. The GUI enables the user to interact with the electronic display by touching or pointing at display areas to provide information to the user interface 40. In additional preferred embodiments, the computing device may also include an optical device such as a digital camera, video camera, optical scanner, or the like, such that the computing device can capture, store, and transmit digital images and/or videos.

It is within the scope of the present invention for the implement 10 to enable verification of furrow depth, furrow width, and/or furrow quality. In particular, the controller 16 is preferably operable to determine if the width of the actual furrow formed by the implement 10 matches a target value of furrow width or falls within a target range of furrow width. For instance, the operator may be alerted (e.g., via the user interface 40) if the measured furrow width is too wide compared to the desired furrow width (see FIG. 6) or too narrow.

Similarly, the controller 16 is preferably operable to determine if the depth of the actual furrow formed by the implement 10 matches a target value of furrow depth or falls within a target range of furrow depth. The operator may also be alerted (e.g., via the user interface 40) if the measured furrow depth is too deep or too shallow compared to the desired furrow depth.

Yet further, the controller 16 is preferably operable to identify the profile shape of the actual furrow and determine if the actual furrow formed by the implement 10 has a furrow sidewall that is collapsing. The operator may be alerted (e.g., via the user interface 40) if the measured furrow is determined to be collapsing before the closing wheels arrive. As shown in FIGS. 5 and 6, the shape or profile of the furrow can be measured and displayed as a cross-section in the user interface 40 with the furrow profile indicia 60.

The described alerts are preferably provided to the operator via the user interface 40 so that the operator may take action (e.g., by making adjustments to the implement 10) to facilitate continued implement operation or to halt implement operation. However, it will also be understood that the controller 16 may be configured to automatically control the seeding implement 10 and take action to facilitate continued implement operation or to halt implement operation without operator intervention.

Embodiments of the preferred implement 10 may be configured to provide the measurements and monitoring of the actual furrow dimensions throughout the planting process. Furthermore, the implement 10 may be operably associated with an autonomous drive system (of the implement or towing vehicle) to adjust the implement 10 if the furrow depth does not match the intended depth setting. Furrow profiles can be monitored, so that if the furrow collapses or is too wide, the drive system or operator is alerted.

Embodiments of the present invention may also detect and measure soil condition parameters, such as the percentage of field residue and soil roughness. The operator may select a target level of soil roughness and residue reduction. Embodiments of the present invention may provide a means to measure and alert the operator if implement settings are meeting the intended targets.

Depth map data may be used by embodiments of the present invention for measuring soil condition metrics relevant to efficient crop planting by measuring changes affected by manual or automated adjustments to the planter equipment to improve and control planting with varied physical conditions. Soil condition parameters may be determined from camera images using: (i) human crafted, traditional machine vision algorithms, and (ii) deep-learning, neural network methods of computer-optimized algorithms for object detection. More details about the use of soil condition parameters are described in a subsequent embodiment.

The seeding implement 10 of the present invention may provide real-time data about seed parameters associated with the seeds S. In preferred embodiments, seed parameters may include data about locations of seeds S in the furrow. Such seed location parameters may include seed depth and lateral seed position. Seed location parameters may also include seed spacing, seed skips, and seed doubles. The controller 16 is preferably configured to use these seed location parameters to determine if an adjacent pair of seeds have been improperly deposited adjacent to one another.

Seed parameters may also include a number of seeds S deposited in the furrow, a velocity of seeds S deposited in the furrow, an impact position of seeds S deposited in the furrow, and a final resting position of seeds S deposited into the furrow. A seed skip is preferably identified when the measured seed spacing dimension between adjacent seeds is greater than a target seed spacing dimension. For instance, a seed skip may be identified if the measured seed spacing dimension is at least twice the target seed spacing dimension. A seed double is preferably identified when the measured seed spacing dimension between adjacent seeds is less than a target seed spacing dimension. For instance, a seed double may be identified if the measured seed spacing dimension is less than one half the target seed spacing dimension.

When seeds S enter the furrow, the seeding implement 10 is configured to detect seeds S and measure the depth relative to the top of the furrow, allowing planting depth to be quantified. Similarly, embodiments can measure the distance between seeds (spacing of seeds) and detect suboptimal planting performance of a row unit. The operator may be alerted by the user interface 40 (or another device) to parameters including: missed seeds (skips), added seeds (doubles), poor spacing, and/or seeds not detected in the furrow F. Similar measurements and operator alerts may also be provided for other seed-like objects, such as fertilizer pellets.

The described alerts are preferably provided to the operator via the user interface 40 so that the operator may take action (e.g., by making adjustments to the implement) to facilitate continued implement operation or to halt implement operation. However, it will also be understood that the controller 16 may be configured to automatically control the seeding implement 10 and take action to facilitate continued implement operation or to halt implement operation without operator intervention.

In the user interface 40, the graphical display element 42 is configured to provide a graphical depiction of the detected seeds S by seed indicia 66 (see FIG. 6). In the depicted embodiment, the graphical display element 42 is configured to overlay the seed indicia 66 on the camera image indicia 58. Preferably, the seed indicia 66 are configured to be overlaid on or adjacent to corresponding seeds S identified from the camera image indicia 58. As depicted, the seed indicia 66 includes a box that is preferably positioned to surround the corresponding seed S.

Controller

In the depicted seeding implement 10, the controller 16 is also configured to process the information obtained by the time-of-flight sensors 14 to generate the one or more furrow parameters and/or seed parameters. For instance, the controller 16 is preferably configured to identify objects in the time-of-flight images received from the sensors. Objects may be identified in the time-of-flight images by various methods, such as machine vision algorithms or deep-learning, neural networks.

The preferred controller 16 may also be configured to generate depth maps based on the time-of-flight images. The depth maps may comprise a matrix of depth values corresponding to pixels of the time-of-flight images. Preferably, the matrix can be used to identify objects and distances between objects.

As described above, in preferred embodiments of the seeding implement 10, the controller 16 is configured to display one or more furrow parameters and/or seed parameters to an operator of the seeding implement 10. The controller 16 is also preferably configured to overlay time-of-flight image data onto other images, such as RGB images from an RGB camera. The controller 16 is also configured to generate an alert if the furrow parameters and/or seed parameters exceed target parameters.

Preferably, the controller 16 is also configured to automatically control operation of one or more components of the seeding implement 10 based on the one or more furrow parameters and/or seed parameters. In preferred embodiments, the controller 16 is configured to automatically control operation parameters of the seeding implement 10, including a speed of the seeding implement, a seed distribution timing of the seeding implement, and a modification of the furrow forming process of the seeding implement. Modification of the furrow forming process may include adjustments associated with one or more furrow parameters, such as furrow width, furrow depth, and furrow quality. For instance, the furrow forming process may be modified by changing at least one of an opener down force, a seed firmer down pressure, and a row cleaner/residue mover position or force. Yet further, the controller may be configured to control at least one parameter associated with a furrow closing process. For instance, the furrow closing process may be modified by changing a closing wheel parameter, such as down force (which may affect the final depth of the seed, depending on how well the closing wheels bring soil back over the seed to close the furrow).

With the seeding implement 10 of the present invention, information on the planting process can be actively monitored as the process continues. A range of tolerances may be set such that the system informs the operator if the planting depth and spacing exceeds specifications at any point in the planting process. Video images may also be presented to the operator (e.g., showing seed placement during planting).

Embodiments of the invention may be used to provide feedback to an operator on monitor screens or other monitoring systems. The invention preferably provides feedback for autonomous drive systems, and such feedback data may provide positive verification of seed, furrow, and soil tillage parameters during planting without requiring operator monitoring or intervention.

Embodiments of the present invention may also be used for verification and feedback on planter downforce systems. For instance, the seeding implement 10 may be configured to include an active downforce system that generally maintains a consistent furrow depth.

Again, the controller 16 and user interface 40 may be provided as part of a computing device of the implement 10. The computing device may include any device, component, or equipment with a processing element and associated memory elements. The processing element may implement operating systems, and may be capable of executing a computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof.

The computing device may specifically include an electronic control unit (ECU) computer, mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones or landline phones.

The user interface 40 of the computing device may enable one or more users to share information and commands with one or more other computing devices (such as the computing device of another implement). The user interface 40 may facilitate interaction through the GUI described above or may additionally comprise one or more functionable inputs such as buttons, keyboard, switches, scrolls wheels, voice recognition elements such as a microphone, pointing devices such as mice, touchpads, tracking balls, styluses. The user interface 40 may also include a speaker for providing audible instructions and feedback. Further, the user interface 40 may comprise wired or wireless data transfer elements, such as a communication component, removable memory, data transceivers, and/or transmitters, to enable the user and/or other computing devices to remotely interface with the computing device of the implement 10.

It is also within the ambit of the present invention for the computing device of implement 10 to be associated with other computing devices and/or server devices via a communications network. For instance, the computing device of implement 10 may be operable to communicate with a computing device of one or more other implements via the communications network. The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

Both the server devices and the computing devices may be connected to the communications network 306. Server devices may communicate with other server devices or computing devices through the communications network. Likewise, computing devices may communicate with other computing devices or server devices through the communications network. The connection to the communications network may be wired or wireless. Thus, the server devices and the computing devices may include the appropriate components to establish a wired or a wireless connection.

Tillage Implement

Turning to FIGS. 7-14, a tillage implement 100 of the present invention is depicted. The remaining description will focus primarily on the differences of this tillage implement embodiment from the preferred seeding implement embodiment described above.

The tillage implement 100 is constructed in accordance with a preferred embodiment of the present invention. The implement 100 may be pulled across a field (which may include one or more sections of ground G) to be tilled. The implement 100 may be pulled by a towing vehicle (not shown) such as a tractor. In various embodiments, the towing vehicle may include an operator-driven vehicle or an autonomous vehicle for towing the implement.

Figure 7:
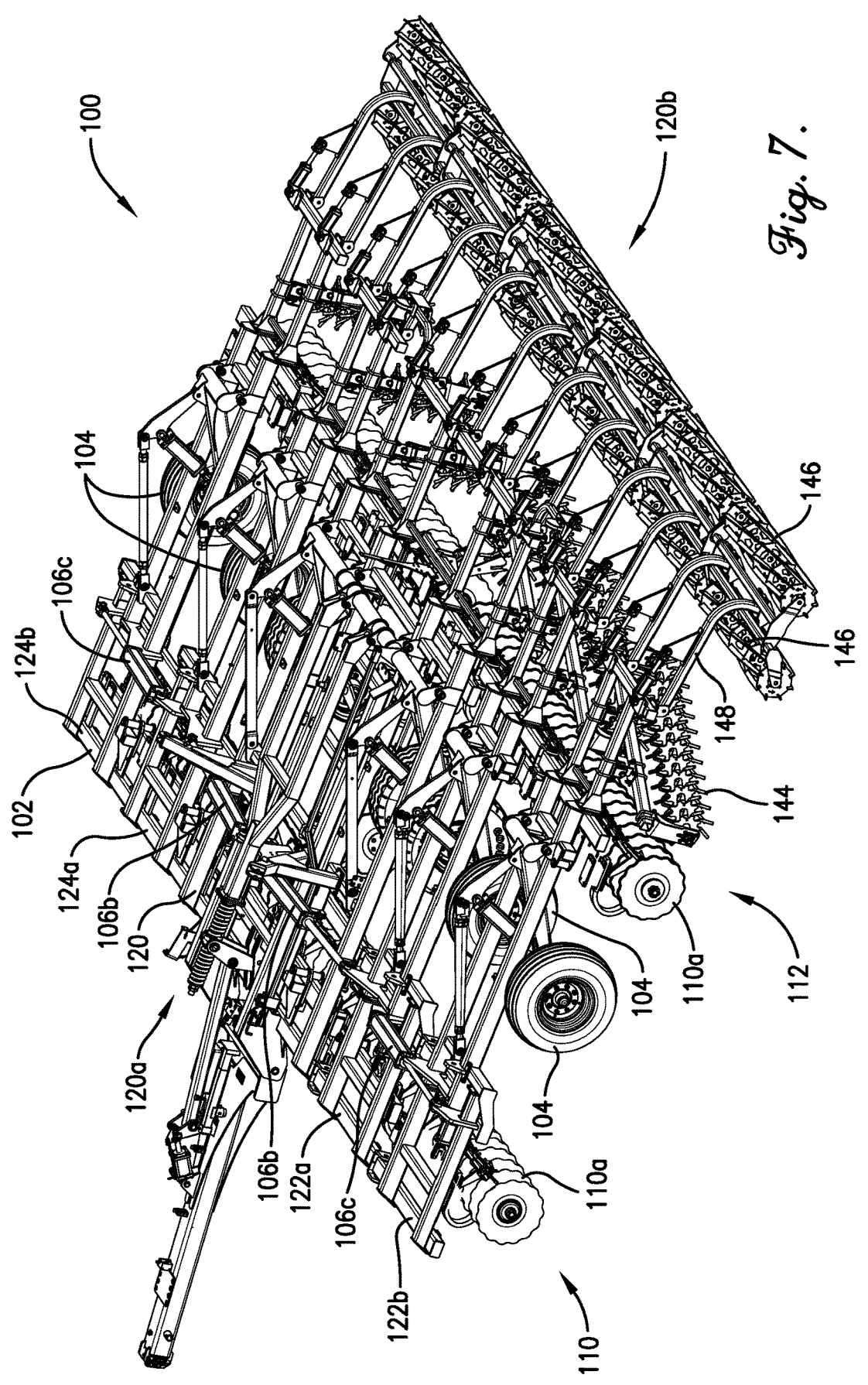
FIG. 7 is a rear perspective view of a tillage implement constructed in accordance with a second preferred embodiment of the present invention, showing a main frame, wheels, hydraulic actuators, a leveling assembly, and front and rear gangs of coulter blades.
Figure 13:
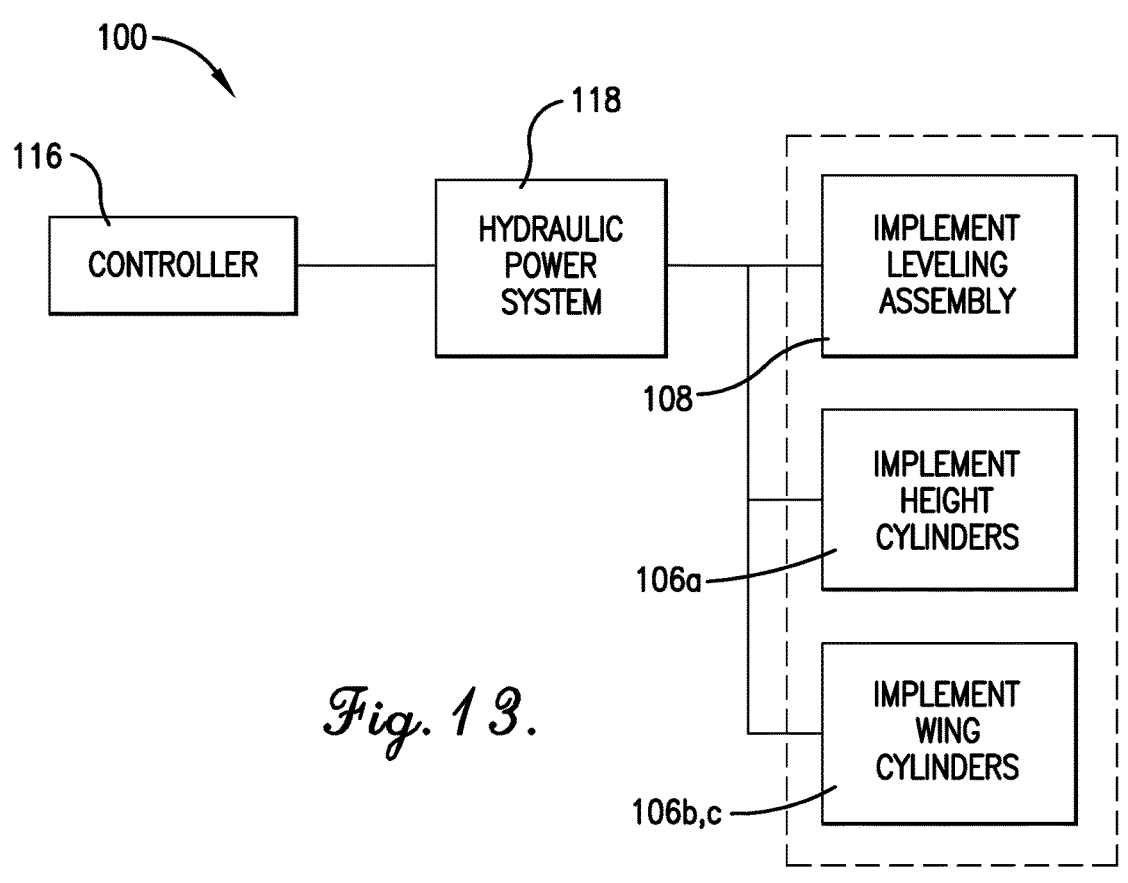
FIG. 13 is a schematic view of the tillage implement shown in FIGS. 7-12, showing the cylinders of the implement operably coupled to a hydraulic power system and controller.
Figure 14:
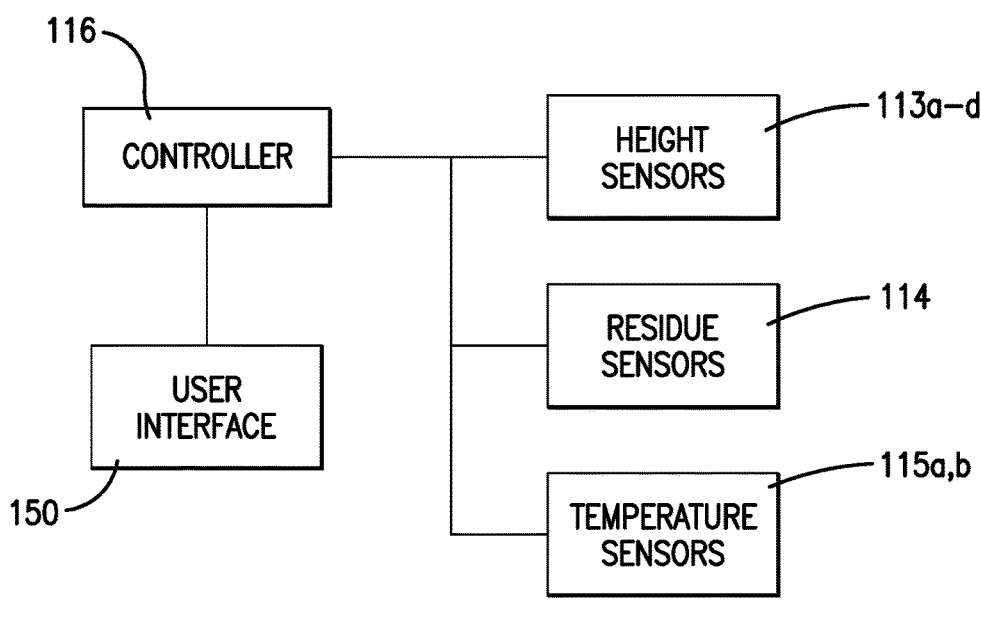
FIG. 14 is a schematic view of the tillage implement shown in FIGS. 7-13, showing the controller operably coupled to a user interface, height sensors, residue sensors, and temperature sensors.

The tillage implement 100 preferably includes a main frame 102 supported above a ground surface by a plurality of wheels 104, hydraulic actuators 106a-d, a leveling assembly 108, front and rear groups 110,112 of coulter blades, height sensors 113, residue sensors 114, temperature sensors 115, a controller 116, and a hydraulic power system 118 (see FIGS. 7, 13, and 14).

As will be explained, sensors 113,114,115 are operably coupled to the controller 116 (see FIG. 14) and can be used on the tillage implement 100 to determine levelness and quality of finish behind the implement and/or implement tools, as well as determine proportion of plant residue left covering the soil. Such sensors may comprise time-of-flight cameras and/or other vision sensors (such as an RGB camera). For instance, a combination of time-of-flight and color sensors may be used to determine residue level. Furthermore, time-of-flight distance measurement may be combined with color data analysis to separate standing residue from ground level residue.

Similar to the previous embodiment, one or more time-of-flight sensors of the tillage implement 100 may comprise a time-of-flight camera. The time-of-flight camera may preferably use monochromatic illumination and/or multi-wavelength illumination. The time-of-flight camera may preferably operate in the UV spectrum, the infrared spectrum, and/or in the visible spectrum. A preferred camera may use LED light sources and/or LASER light sources. A preferred camera may include photo-detection elements.

Embodiments of the present invention may, additionally or alternatively, have time-of-flight sensors 14 that include LiDAR sensors, radar sensors, ultrasonic sensors, and/or sonar sensors.

In various embodiments within the ambit of the present invention, the sensors 113,114,115 may be used to obtain information and to provide feedback to the controller 116 for initiating adjustments of one or more of the following implement operating parameters: disk gang angle; inner wing weight transfer hydraulic pressure; outer wing weight transfer hydraulic pressure; primary lift cylinder height position; fore-aft leveling linkage hydraulic cylinder position; and rear attachment down/up force hydraulic cylinder pressure (and direction). One or more of such parameters may be adjusted to obtain or optimize user specified levels of residue, roughness (such as uniformity of soil clump/clod size), depth of tillage, surface soil moisture level after pass, uniformity of surface levelness.

Preferred implement embodiments may permit the operator to rank the priority of target parameters when multiple targets conflict or cannot be simultaneously met. Furthermore, the preferred implement may allow the operator to specify a limited range for target parameter adjustments when attempting to reach target results (for instance, the operator may specify a tillage depth range that must remain between about three inches (3") and about four inches (4").

As used herein to describe the implement, the term "level" is generally meant to refer to a uniform height of the implement main frame 102 with respect to the ground regardless of the terrain shape or slope. The term "level" may or may not correspond to a horizontal condition at a particular location.

Implement Frame

Turning to FIGS. 8-10B, the main frame 102 is configured to carry a plurality of ground-engaging tools, which will be described in more detail below. One or more of the wheels 104 may comprise depth-adjustment wheels configured to be adjustable up and down relative to main frame 102 by hydraulic actuators 106a for thereby controlling (i) the depth of soil penetration of the ground-engaging tools when the implement 100 is lowered to an operating configuration, and/or (ii) the height of the ground-engaging tools above the ground when the implement 100 is raised to a transport configuration.

The implement 100 may include a plurality of wheels 104 arranged generally in a laterally extending row. The number of wheels 104 may vary depending on the size of the implement 100 and/or on the requirements of the tilling operations. However, as shown in the figures, the implement 100 may have eight wheels 104, including four interior wheels 104 and four outer wheels 104. As noted previously, the wheels 104 are configured to support the main frame 102 above the ground G. The wheels 104 also preferably comprise depth-adjusting wheels that are actuatable by the hydraulic actuators 106a to transition the implement 100 between an operational configuration (e.g., FIGS. 9A and 9B), where at least some of the tools are engaged with the ground, and a transport configuration (not shown), where the tools are largely disengaged from the ground. Thus, the main frame 102 is generally positioned closer to the ground when in the operational configuration than in the transport configuration.

The hydraulic actuators 106a preferably comprise hydraulic cylinders. However, it is also within the scope of the present invention for the actuators 106a to include an alternative linear actuator or rotational actuator device.

Figure 12:
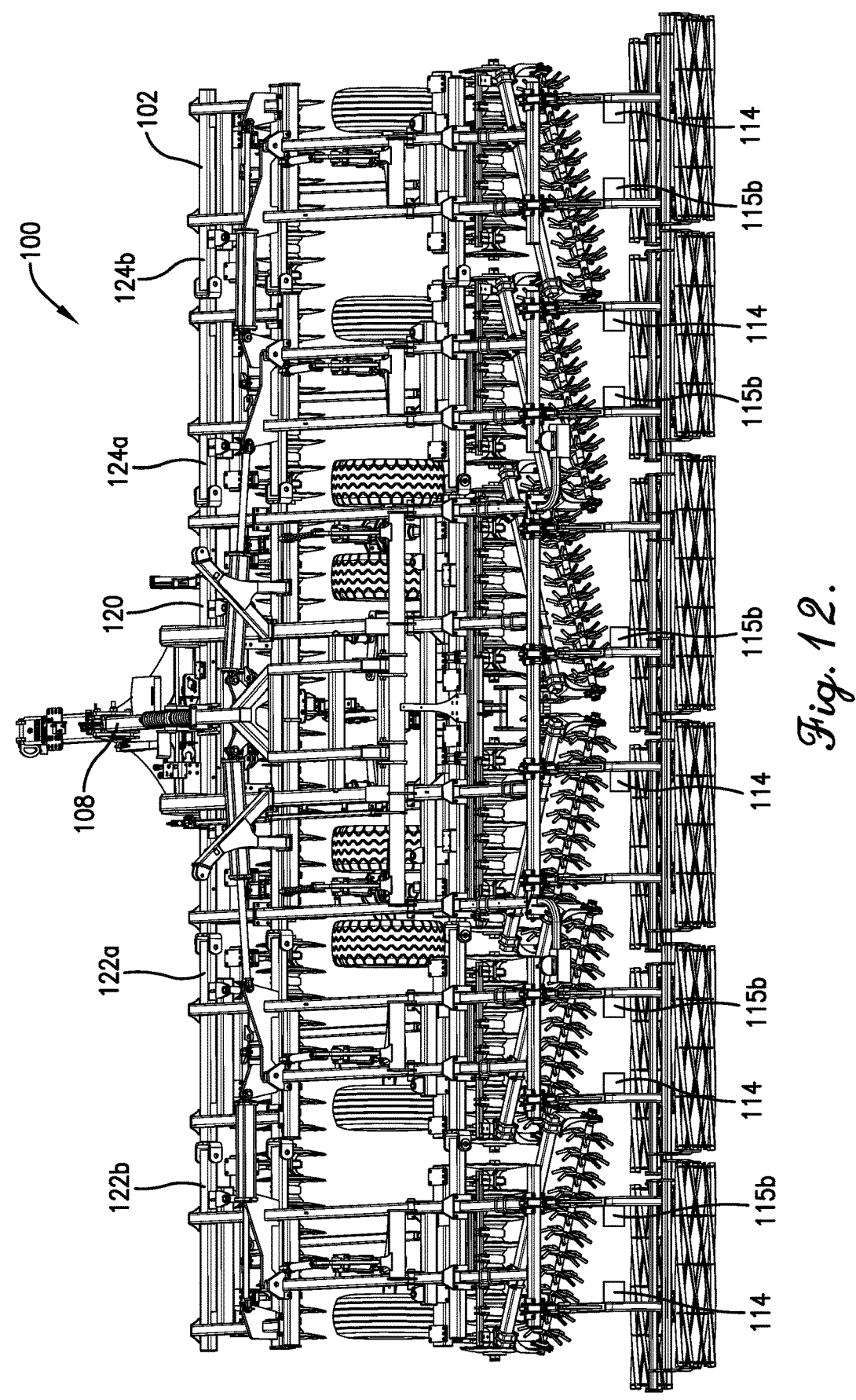
FIG. 12 is a rear perspective of the tillage implement shown in FIGS. 7-11.

In the depicted embodiment, the main frame 102 preferably includes a central section 120, an inner left wing section 122a, an outer left wing section 122b, an inner right wing section 124a, and an outer right wing section 124b, as illustrated in FIGS. 12 and 13. The inner left and right wing sections 122a, 124a are configured to pivot upward/downward with respect to the central section 120. The outer left and right wing sections 122b, 124b are configured to pivot upward/downward with respect to the inner left and right wing sections 122a, 124a.

Figure 8:
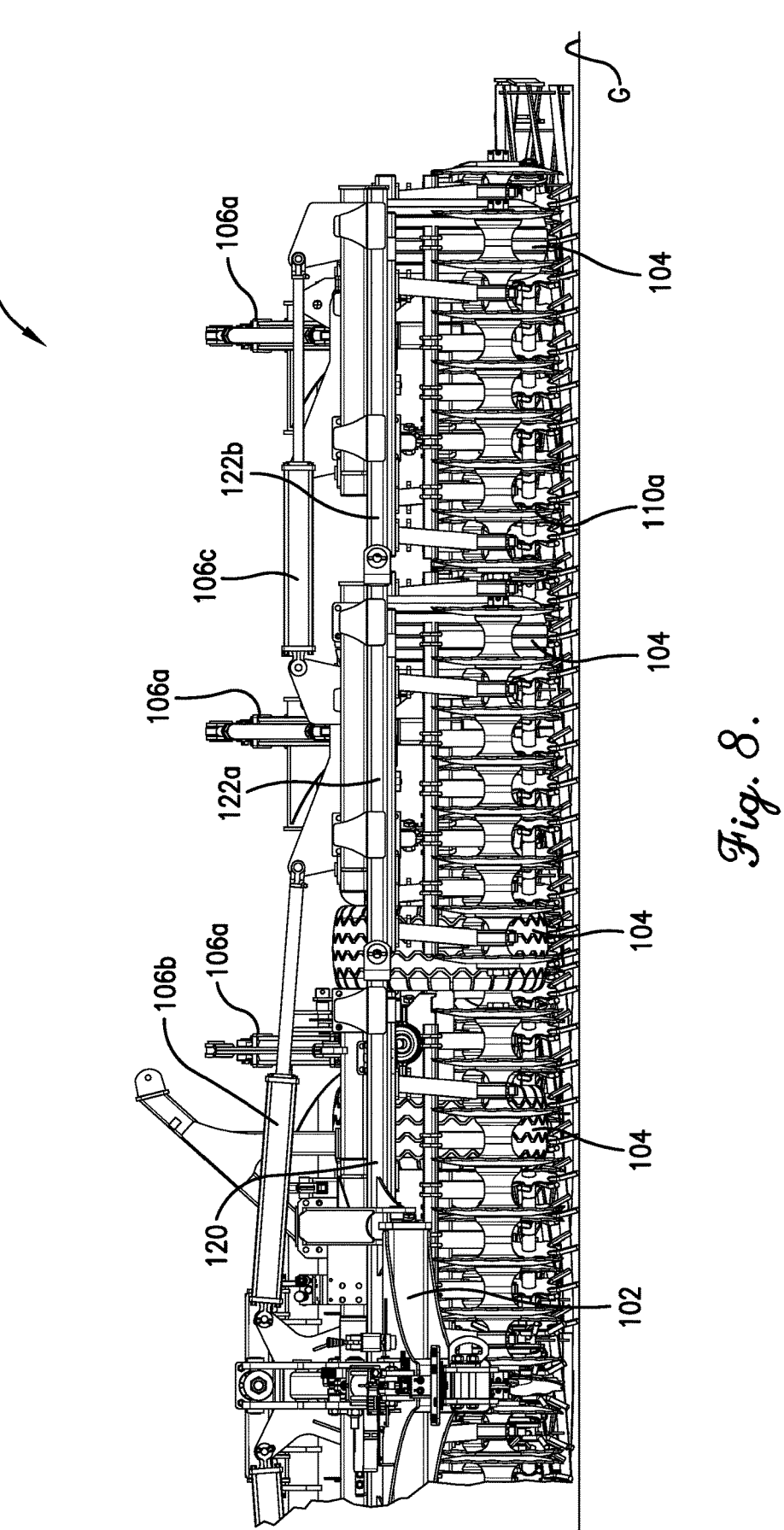
FIG. 8 is a fragmentary front elevational view of the tillage implement shown in FIG. 7, showing a central section, a left inner wing section, and left outer wing section, with the wing sections operable to be folded and unfolded relative to the central section by hydraulic actuators.
Figure 9A:
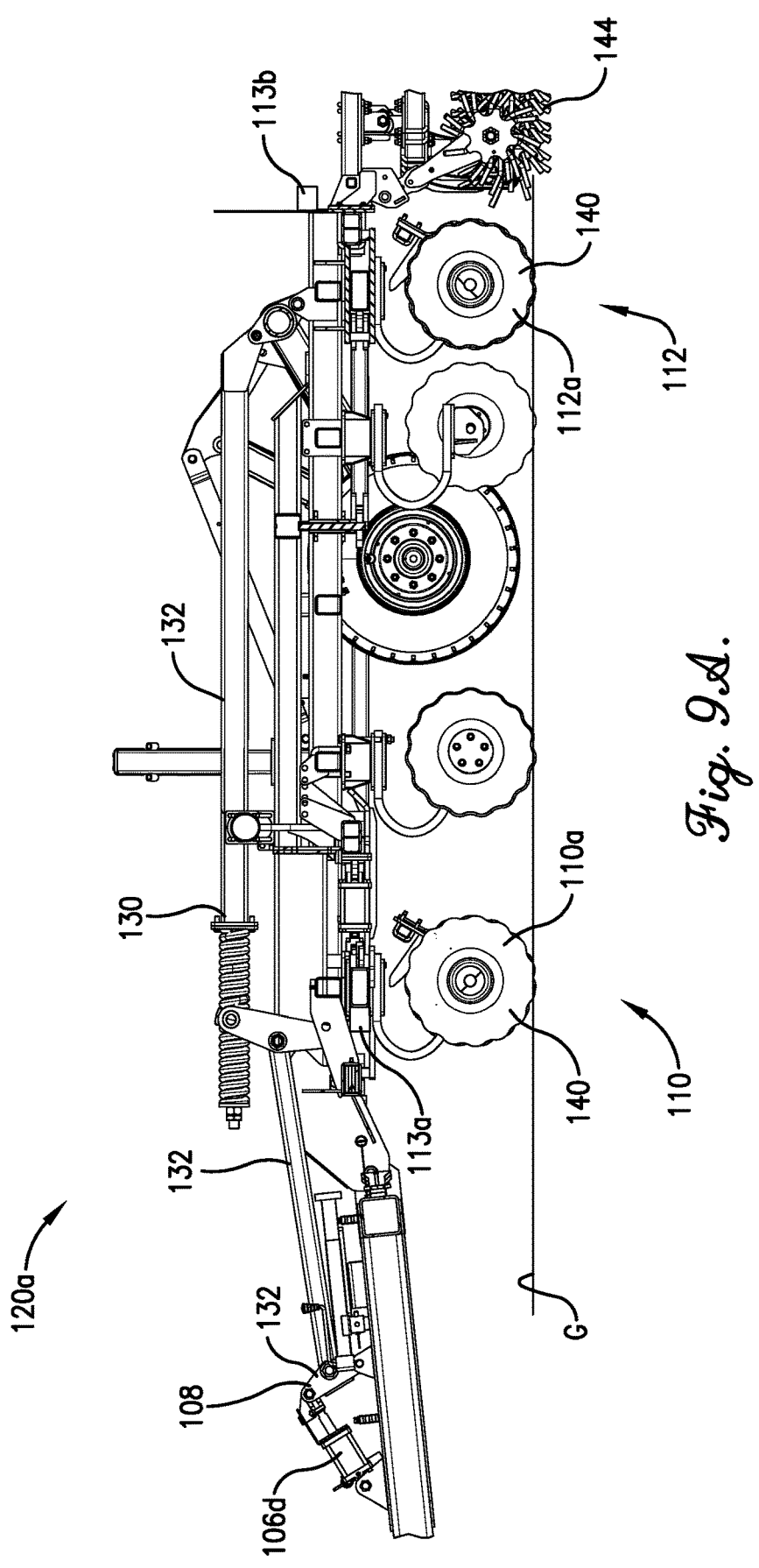
FIG. 9A is a fragmentary side elevational view of the tillage implement shown in FIGS. 7 and 8, showing the leveling assembly used to level the tillage implement in a fore-and-aft direction.
Figure 9B:
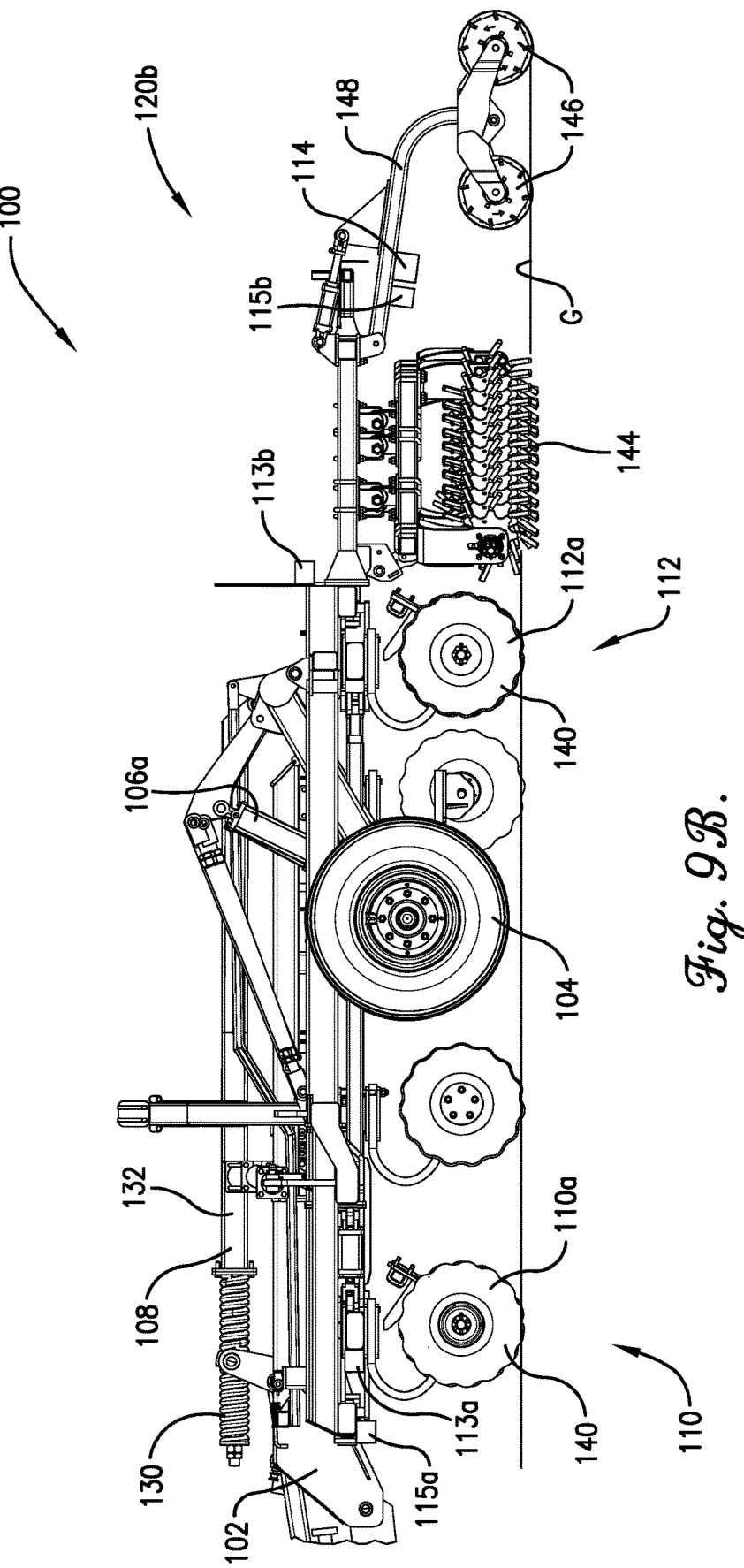
FIG. 9B is a fragmentary side elevational view of the tillage implement similar to FIG. 9A, but showing finishing reels behind the rear gangs of coulter blades.

When in the operational configuration, the wing sections 122a,122b,124a,124b will generally be orientated in parallel relationship with the central section 120 (i.e., orientated generally horizontally), as shown in FIG. 8. However, it will be understood that the wing sections may be pivoted out of the parallel orientation relative to the central section while remaining in the operational configuration (e.g., to remain parallel with the soil surface when encountering uneven terrain such as a terrace on a hillside field).

In the transport configuration, the wing sections 122a, 122b,124a,124b may be rotated upward out of the parallel relationship with the central section 120. For instance, the wing sections may be located above the central section and extend upwardly at an oblique or perpendicular orientation relative to the central section 120.

Embodiments of the present invention may be used on frames other than the five-section frame discussed above. For example, embodiments of the present invention may be used with a three-section frame, which may include a central section, a left wing section, and a right wing section.

Implement Height and Actuation

The height sensors 113 preferably comprise a time-of-flight sensor, which may include a time-of-flight camera. The height sensors 113*a,b* are preferably attached to the central section 120 along respective front and back ends 120*a,b*. The height sensors 113*c,d* are preferably attached to respective inner and outer wing sections 122*a*,122*b*,124*a*, 124*b*. Most preferably, each wing section 122*a*,122*b*,124*a*, 124*b* has a corresponding height sensor 113*c,d* attached adjacent an outboard end of the wing sections and along the front end 120*a*. As will be explained, the height sensors 113 are operable to facilitate leveling of the tillage implement 100.

For height sensing, time-of-flight cameras (e.g., distance sensors) are operable to output signals (e.g., light waves) that travel to the ground surface below the sensors, reflect off the surface, and return to the camera. In the depicted embodiment, the central section 120 includes at least one sensor 113*a* along a front end 120*a* and at least one sensor 113*b* along a back end 120*b*. It will be understood that certain wavelengths may be better at penetrating dust in the air and plant residue materials while bouncing cleanly off soil. However, in at least some alternative embodiments, sound waves may be used in place of light waves.

In use, multiple surfaces associated with the ground G will reflect the signal due to uneven terrain, residue, and/or other objects along the ground G. Embodiments of the present invention may use an algorithm to determine from the range of reflected signals average height values from the ground to the sensors. Such calculations are preferably performed for each of the sensors (e.g., the front sensor and the rear sensor).

The actuators 106 preferably include inner hydraulic actuators 106*b* that are operably connected to the inner left and right wing sections 122*a*, 124*a* and the central section 120 (see FIGS. 7 and 8). The actuators 106*b* are configured to pivot the inner left and right wing sections 122*a*, 124*a* upward/downward relative to the central section 120. Similarly, the outer hydraulic actuators 106*c* are operably connected to the outer left and right wing sections 122*b*, 124*b* and the inner wing sections 122*a*, 122*b* (see FIGS. 7 and 8). The actuators 106*c* are configured to pivot the outer left and right wing sections 122*b*, 124*b* upward/downward relative to the inner wing sections 122*a*, 122*b*.

During operation, the actuators 106*b,c* are configured to apply a force outward and/or downward upon the corresponding wing sections 122*a*,122*b*,124*a*,124*b*. For instance, in the operational configuration, the actuators 106*b,c* are preferably configured to transfer at least a portion of weight of the central section 120 to or from the wing sections 122*a*,122*b*,124*a*,124*b*. In preferred embodiments, the transfer of weight between the central section 120 and the wing sections 122*a*,122*b*,124*a*,124*b* may be configured to ensure that ground-engaging tools (such as the coulter blades 110,112) of the tillage implement 100 operate at a uniform depth within the ground.

The hydraulic actuators 106*b*,106*c* preferably comprise hydraulic cylinders. However, it is also within the scope of the present invention for the actuators 106*b*,106*c* to include an alternative linear actuator or rotational actuator device.

The hydraulic actuators 106*a-d* are preferably operably coupled to and powered by the hydraulic power system 118, which may be operated by the controller 116. In the usual manner, the hydraulic power system 118 includes, among other things, a hydraulic pump (not shown) to selectively advance pressurized hydraulic fluid to and from the actuators 106*a-d*.

In embodiments in which the actuators are hydraulic cylinders, weight transfer between the frame sections can be controlled by adjusting the hydraulic pressure applied to the cylinders, traditionally with a manually set hydraulic pressure reducing valve. In at least some embodiments, a predetermined pressure may be applied to the cylinders. For instance, a hydraulic pressure of 400 psi may be applied to the actuators 106*b* (to apply a corresponding force to the inner wing sections 122*a*,124*a*), and a pressure of about half (e.g., about 200 psi) to the actuators 106*c* (to apply a corresponding force to the outer wing sections 122*b*,124*b*).

The central section 120 and wing sections 122*a*,122*b*, 124*a*,124*b* preferably include respective height sensors 113*a,b,c,d* configured to obtain height information indicative of a height of the section above the ground (see FIGS. 9A-10B). The controller 116 is configured to use data from the height sensors 113 to compare the heights of the inner and outer wing sections 122*a*,122*b*,124*a*,124*b* with the height of the central section 120.

The controller 116 is configured to reduce pressure to the inner hydraulic actuators 106*b* when the heights of the inner wing sections 122*a*, 124*a* are determined to be less than the height of the central section 120. Similarly, the controller 116 is configured to increase pressure to the inner hydraulic actuators 106*b* when the heights of the inner wing sections 122*a*, 124*a* are determined to be greater than the height of the central section 120.

Furthermore, the controller 116 is configured to reduce pressure to the outer hydraulic actuators 106*c* when the heights of the outer wing sections 122*b*, 124*b* are determined to be less than the height of the central section 120. In at least some embodiments, the controller 116 may be configured to reduce weight transfer from the inner wing sections 122*a*, 124*a* to the outer wing sections 122*b*, 124*b* when the heights of the outer wing sections 122*b*, 124*b* are determined to be less than the height of the central section 120.

Similarly, the controller 116 is configured to increase pressure to the outer hydraulic actuators 106*c* when the heights of the outer wing sections 122*b*, 124*b* are determined to be greater than the height of the central section 120. In at least some embodiments, the controller 116 may increase weight transfer from the inner wing sections 122*a*, 124*a* to the outer wing sections 122*b*, 124*b* when the heights of the outer wing sections 122*b*, 124*b* are determined to be greater than the height of the central section 120. In this manner, the controller is configured to level frame sections of the tillage implement from side to side.

Implement Leveling

The leveling assembly 108 is preferably configured to adjust a front-to-rear orientation of the central section 120. The leveling assembly 108 includes a fore-and-aft extending linkage 130 with links 132 and a hydraulic actuator 106*d*. The actuator 106*d* is configured to drive the linkage 130 to shift the central section 120 so that the height of a front end 120*a* of the central section 120 is increased relative to the height of a back end 120*b* of the central section 120. The actuator 106*d* is also configured to drive the linkage 130 to shift the central section 120 so that the height of the front end 120*a* of the central section 120 is decreased relative to height of the back end 120*b* of the central section 120.

The hydraulic actuator 106*d* preferably comprises a hydraulic cylinder and is operably coupled to the hydraulic power system 118. However, it is also within the scope of the present invention for the actuator 106d to include an alternative linear actuator or rotational actuator device.

The controller 116 is configured to receive the height information from a front height sensor 113a and the height information from a rear height sensor 113b (see FIGS. 9A-10B). The controller 116 is also operable to provide instructions to the leveling assembly 108 to adjust the front to rear orientation of the central section 120 based on the received height information.

In particular, the controller 116 is configured to compare the front height value from the front sensor 113a and the rear height value from the rear sensor 113b to determine an actual (i.e., measured) level value of the central section 120. Preferably, the level value comprises a difference between the front and rear height values. However, the front-to-rear level value may be alternatively characterized (e.g., as an angular value).

The controller 116 is also preferably configured to receive a desired target level value and/or target level range. Furthermore, the controller 116 is operable to compare the actual level value with the target level value or target level range.

The implement 100 is preferably configured so that the target level value or range generally corresponds with the main frame 102 being generally parallel to the surface of the ground G along the fore-and-aft direction. However, it is also within the ambit of the present invention for the target level value or range to be associated with the main frame 102 in a non-parallel relationship with the ground G. For instance, the implement 100 may be operated so that the back end 120b is set deeper than the front end 120a. Conversely, the implement 100 may be operated so that the front end 120a is set deeper than the back end 120b. It will be appreciated that a non-parallel target level value may be preferable in order to optimize the completed tillage operation outcome. The non-parallel target level value may be determined based upon various factors, such as soil hardness, relative effect of front coulter gangs compared to rear coulter gangs, etc.

In use, an operation step of the implement 100 involves adjustment of the leveling assembly 108 to level the implement frame from front to back (referred to herein as "Step 1"). The height values for the front and rear sensors 113a, 113b are preferably compared with each other to determine the difference. If the difference is outside a target level range, the controller 116 will preferably send a signal to extend or retract the hydraulic actuator 106d.

For instance, if the front end is too low relative to the back end, the controller 116 will provide a signal to extend the hydraulic actuator 106d to raise the front end and/or lower the rear end of the central section 120 until the two height values (as measured at the front sensor and the rear sensor) are within the target range of each other.

Alternatively, if the front end is too high relative to the back end, the controller 116 will provide a signal to retract the hydraulic actuator 106d to lower the front end and/or raise the rear end of the central section 120 until the two height values (as measured at the front sensor and the rear sensor) are within the target range of each other.

The controller 116 is also preferably configured to level frame sections of the tillage implement 100 from side to side. In particular, the controller 116 is configured to compare the front height value from the front sensor 113a of the central section 120 and the height values from the sensors 113c,d of the wing sections 122a,122b,124a,124b to determine an actual (i.e., measured) side-to-side level value of the main frame 102. Preferably, the level value comprises a difference between the section height values. However, the side-to-side level value may be alternatively characterized (e.g., as an angular value).

The controller 116 is also preferably configured to receive a design target side-to-side level value and/or target level range. Furthermore, the controller 116 is operable to compare the actual side-to-side level value with the target level value or target level range.

An operation step of the implement 100 involves adjustment of the inner weight transfer hydraulic pressure supplied to inner hydraulic actuators 106b to level the inner wing sections 122a,124a relative to the central section 120 (referred to herein as "Step 2").

The inner hydraulic actuators 106b may be used in the field to apply force outwards and/or downwards upon the inner wing sections 122a,124a to transfer a portion of the weight of the central section out upon the inner wing sections and/or the outer wing sections. In embodiments in which the actuators 106b are hydraulic cylinders, the amount of force transferred between the frame sections can be defined by controlling the hydraulic pressure applied to the cylinders, traditionally with a manually set hydraulic pressure reducing valve.

Embodiments of the present invention start the control process with a generic standard pressure applied to the weight transfer system, typically 400 psi for the inner wing sections and half of that (e.g., 200 psi) to the outer wing sections. The objective of such a weight transfer is to transfer load off the central section and/or inner wing sections that are heavier, out onto the outer wing sections that are lighter so that all of the frame sections do an equivalent job and operate at uniform depth.

The height values for the sensors 113a,113b,113c are preferably compared with each other to determine level differences between the inner wing sections 122a,124a and the central section 120. If a side-to-side level difference is outside a target level range, the controller 116 will preferably send a signal to extend or retract the corresponding inner hydraulic actuator 106b.

For instance, if an inner wing section 122a,124a is too low relative to the central section 120, the controller 116 will provide a signal to retract the inner hydraulic actuator 106b to raise the inner wing section 122a,124a until the height values measured by respective sensors 113a,113b,113c are within the target range of each other. In other words, the controller 116 is configured to reduce pressure to the inner hydraulic actuators 106b when the heights of the inner wing sections 122a, 124a are determined to be less than the height of the central section 120. For at least some aspects of the present invention, it may be possible to reduce the outward pressure of the hydraulic actuator to zero and instead apply an inward pressure to lift the wing if needed. For instance, such use may be suitable when the center section 120 is located on relatively hard soil (e.g., a relatively dry soil) and a wing section is located on relatively soft soil (e.g., a relatively sandy soil or wet soil).

Conversely, if an inner wing section 122a,124a is too high relative to the central section 120, the controller 116 will provide a signal to extend the inner wing actuator 106b to lower the inner wing section 122a,124a until the height values measured by respective sensors 113a,113b,113c are within the target range of each other. In other words, the controller 116 is configured to increase pressure to the inner hydraulic actuators 106b when the heights of the inner wing sections 122a, 124a are determined to be greater than the height of the central section 120.

For embodiments of the present invention, the average of height readings of the central section 120 (e.g., as obtained from the front sensor 113*a* and rear sensor 113*b* associated with the central section 120) may be used as the target objective for the inner wing sections 122*a*,124*a*. One of each of the same type of distance sensors may be mounted on the outboard end of each inner wing section. The average of these two wing sensor distances may be computed and compared to the central section height distance by the controller. If such distances are within target range, no adjustments are made. If the wing sensors 113*c* indicate the inner wing sections 122*a*,124*a* are too low compared to the center section 120, then the pressure at the hydraulic actuators 106*b* may be reduced to remove weight transfer force. If the wing height is too high, the pressure may be increased to add weight transfer force. In the preferred embodiment, there may be no adjustment (raising or lowering) of the wheels that support the wings during this process, only the weight transfer force may be adjusted.

An operation step of the implement 100 involves adjustment of the outer weight transfer hydraulic pressure supplied to outer hydraulic actuators 106*c* to level the outer wing sections 122*b*,124*b* relative to the central section 120 (referred to herein as "Step 3"). The same process used to level the inner wing sections 122*a*,124*a* relative to the central section 120 in Step 2 above may be used to level the outer wing sections 122*b*,124*b* to match the orientation of the inner wing sections 122*a*,124*a*.

The outer hydraulic actuators 106*c* may be used in the field to apply force outwards and/or downwards upon the outer wing sections 122*b*,124*b* to transfer a portion of the weight of the central section and/or inner wing sections out upon the inner wing sections and/or the outer wing sections. In embodiments in which the actuators 106*c* are hydraulic cylinders, the amount of force transferred between the frame sections can be defined by controlling the hydraulic pressure applied to the cylinders, traditionally with a manually set hydraulic pressure reducing valve.

The height values for the sensors 113*a*,113*d* are preferably compared with each other to determine level differences between the outer wing sections 122*b*,124*b* and the central section 120. If a side-to-side level difference is outside a target level range, the controller 116 will preferably send a signal to extend or retract the corresponding outer hydraulic actuator 106*c*.

For instance, if an outer wing section 122*b*,124*b* is too low relative to the central section 120, the controller 116 will provide a signal to retract the outer hydraulic actuator 106*c* to raise the outer wing section 122*b*,124*b* until the height values measured by respective sensors 113*a*,113*d* are within the target range of each other. In other words, the controller 116 is configured to reduce pressure to the outer hydraulic actuators 106*c* when the heights of the outer wing sections 122*b*,124*b* are determined to be less than the height of the central section 120. In at least some embodiments, the controller 116 may be configured to reduce weight transfer from the inner wing sections 122*a*, 124*a* to the outer wing sections 122*b*, 124*b* when the heights of the outer wing sections 122*b*, 124*b* are determined to be less than the height of the central section 120.

Conversely, if an outer wing section 122*b*,124*b* is too high relative to the central section 120, the controller 116 will provide a signal to extend the outer hydraulic actuator 106*c* to lower the outer wing section 122*b*,124*b* until the height values measured by respective sensors 113*a*,113*d* are within the target range of each other. In other words, the controller 116 is configured to increase pressure to the outer hydraulic actuators 106*c* when the heights of the outer wing sections 122*b*, 124*b* are determined to be greater than the height of the central section 120. In at least some embodiments, the controller 116 may increase weight transfer from the inner wing sections 122*a*, 124*a* to the outer wing sections 122*b*, 124*b* when the heights of the outer wing sections 122*b*, 124*b* are determined to be greater than the height of the central section 120.

Ground-Engaging Tools

Figure 10A:
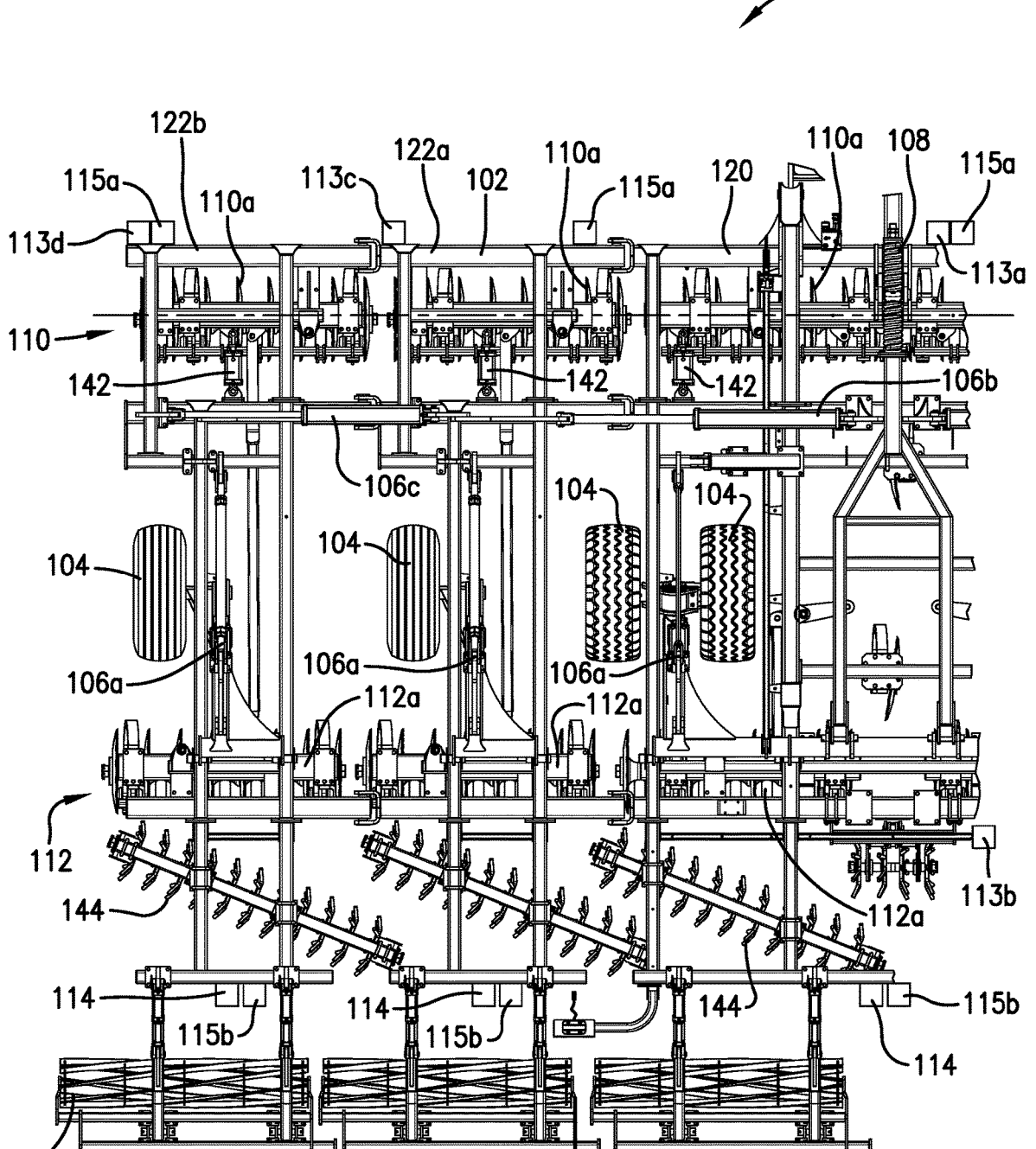
FIG. 10A is a fragmentary top view of the tillage implement shown in FIGS. 7-9B, showing front and rear gangs of coulter blades having a gang angle of zero.
Figure 10B:
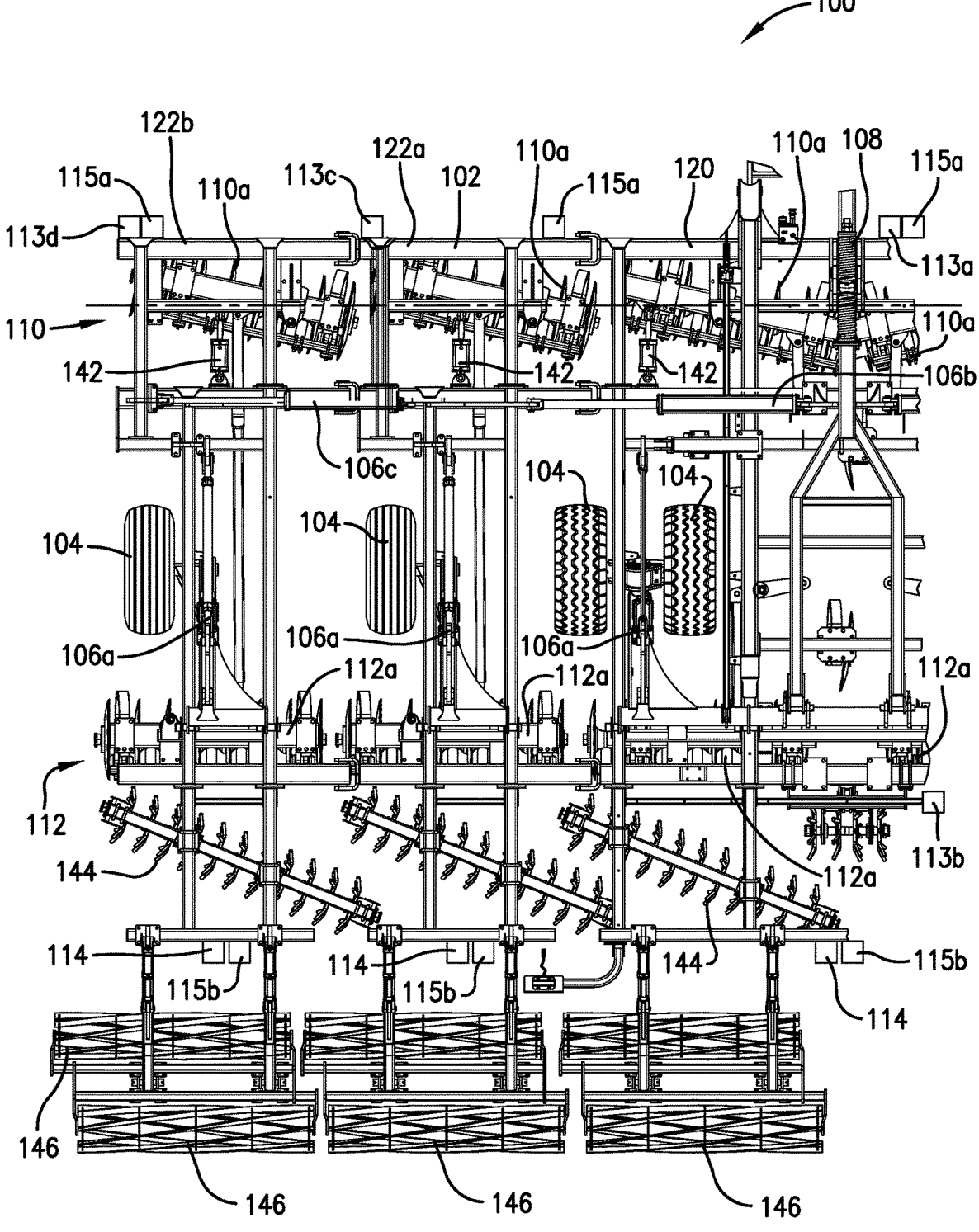
FIG. 10B is a fragmentary top view of the tillage implement similar to FIG. 10A, but showing the front gangs of coulter blades shifted to have a gang angle greater than zero.
Figure 11:
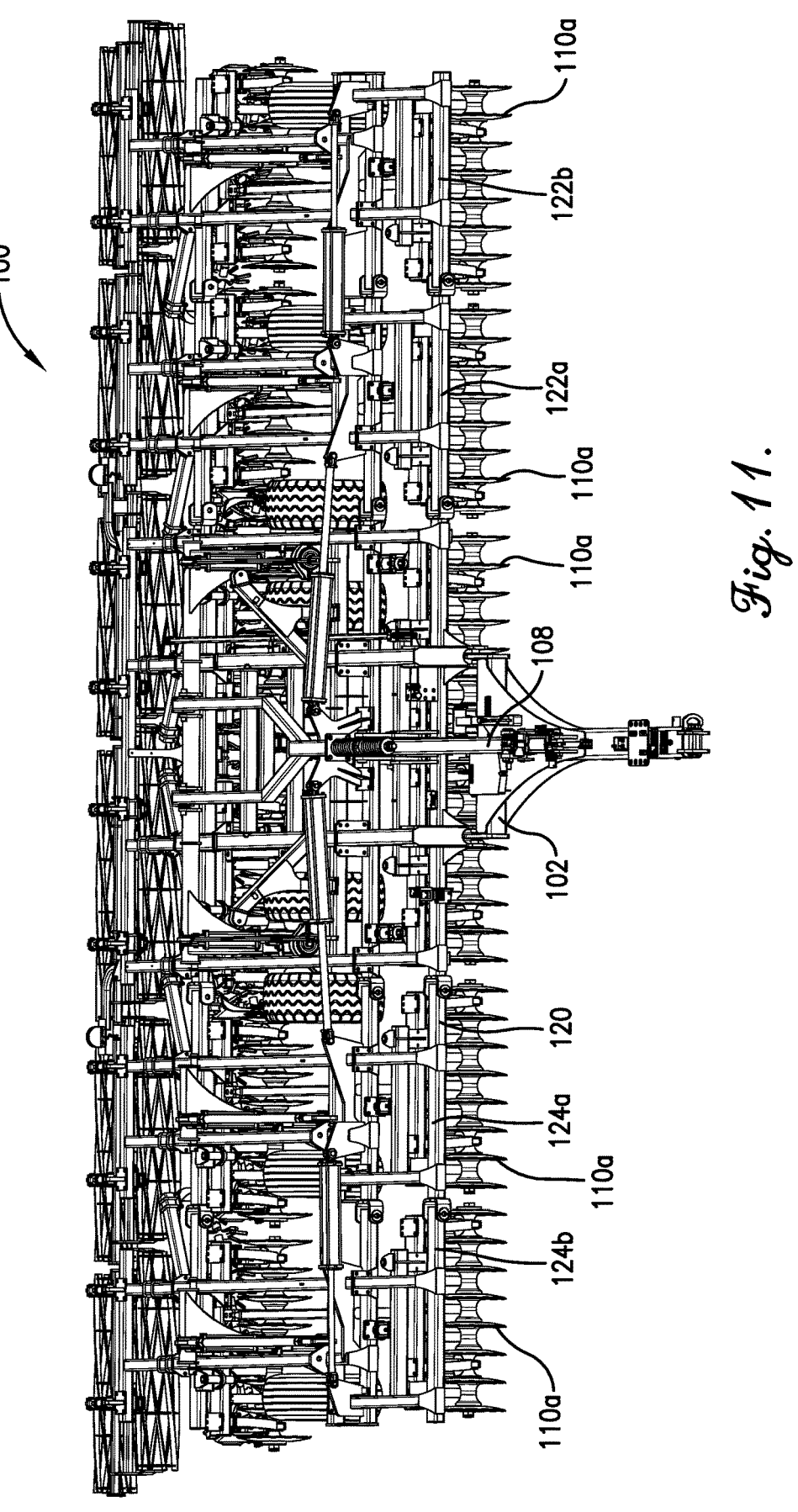
FIG. 11 is a front perspective of the tillage implement shown in FIGS. 7-10B.

Turning to the soil-engaging tools, the implement 100 may include, as illustrated in FIGS. 7, 10A, and 10B, front and rear groups 110,112 of coulter blades. The front group 110 of coulter blades are carried by and extend down from the main frame 102. The front group 110 of coulter blades may extend generally laterally across main frame 102 of the implement 100. In some embodiments, the front group 110 of coulter blades may be configured as a plurality of individual gangs 110*a* of coulter blades. For example, the implement 100 may include a front group 110 of coulter blades that comprises six individual gangs 110*a* of coulter blades, as perhaps best shown in FIG. 10A. Each gang 110*a* may comprise eight individual coulter blades. As used herein, the term "gang" refers to a group of ground-engaging tools that are linked together so as to be actuated as a unit.

In addition, the implement 100 may include a rear group 112 of coulter blades carried by and extending down from the main frame 102. The rear group 112 of coulter blades may extend generally laterally across the main frame 102 of the implement 100. The rear group 112 of coulter blades may be configured as a plurality of gangs 112*a* of coulter blades. For example, the implement 100 may include a rear group 112 of coulter blades that comprises six individual gangs 112*a* of coulter blades. Each gang may comprise eight individual coulter blades.

The coulter blades may be configured as disc blades 140 (see FIGS. 9A and 9B), which may take any of various forms. For instance, the coulter blades 140 may include concave discs. In some embodiments, the disc blades may each comprise a plurality of waves or fluted sections on circumferential portions of the disc blades.

Again, the front and rear groups 110, 112 of coulter blades each include six gangs. Alternative implement embodiments may include any number of gangs, with each gang including any number of coulter blades. For example, in some embodiments, the implement may include between six to fourteen coulter blades on each gang. Each gang of coulter blades may comprise a support frame that is connected to and extends down from the main frame 12 and that rotatably supports its associated coulter blades such that each of the coulter blades can rotate about an individual rotational axis. As perhaps best shown in FIGS. 5 and 6, each of the gangs of coulter blades may be rotatable by a gang angle about a vertical, upright pivot axis 32. The pivot axis 32 of each gang of coulter blades may represent a connection point between the gang and the main frame 12.

The gangs 110*a*,112*a* of coulter blades may have their gang angles adjusted via an actuator 142, such as a hydraulic cylinder, that extends between the main frame 102 and the gangs 110*a*,112*a* (see FIGS. 10A and 10B). In operation, the gangs 110*a*,112*a* of coulter blades may be oriented in a generally laterally-extending position (e.g., FIG. 10A), such that the gangs extend generally laterally across the main frame 102 of the implement 100 (i.e., the gang angle formed between each gang and the lateral direction is equal to zero). In such an orientation, the coulter blades of each gang are disposed straight ahead, generally in parallel alignment with the travel direction of the implement 100.

In contrast, the gangs 110a,112a of coulter blades can be shifted or rotated to an oblique position (e.g., FIG. 10B) in which the gangs 110a,112a are orientated at an angle with respect to the lateral direction of the implement 100 (i.e., the gang angle formed between each gang and the lateral direction is greater than zero). In such an orientation, the coulter blades of each gang 110a,112a are disposed at an oblique angle with respect to the travel direction of the implement 100. The term "gang angle" generally refers to the angle formed between a gang and a lateral direction with respect to the implement 100. However, the gang angle may approximate the angle formed between the individual coulter blades of the gang and the travel direction of the implement 100 (i.e., the longitudinal direction).

In view of the above, each of the gangs of the front and rear groups 20, 22 of coulter blades can be shifted and/or rotated (e.g., via the actuators 142) to any orientation between a minimum gang angle and a maximum gang angle. More details about adjustment of gang angle are disclosed in U.S. application Ser. No. 15/843,456, entitled TILLAGE IMPLEMENT, which is hereby incorporated in its entirety by reference herein.

The implement 100 may additionally comprise ground-engaging tools in the form of gangs 144 of harrow assemblies and gangs 146 of finishing reels carried by and extending down from the main frame 12 (see FIGS. 9A-10B). The gangs of harrow assemblies 26 may extend generally laterally across the implement 100. Similarly, the gangs 146 of finishing reels may extend generally laterally across the main frame 102 of the implement 100.

As depicted, the finishing reels may be supported by a subframe 148 (see FIGS. 7 and 9B) that extends rearward from the main frame 102. In certain embodiments, the subframe 148 may form part of the main frame 102. More details about the preferred harrow assemblies and finishing reels are disclosed in above-incorporated '456 application.

An operation step of the implement 100 involves adjustment of the overall height of the tillage implement frame relative to ground G to achieve a target depth of the ground-engaging tools (referred to herein as "Step 4"). As described with Steps 1-3 above, embodiments are configured to have the entire tillage implement frame 102 operating at uniform height fore/aft and left/right. Thereafter, embodiments may further allow for the tillage implement height to be fine-tuned/adjusted to precisely control the depth at which the ground-engaging tools are engaged with the soil.

The entire tillage implement 100 operates with a common lift/lower hydraulic circuit that regulates overall frame height. In particular, the average frame height of all the sensors 113 positioned on the tillage implement 100 (e.g., front and rear sensors 113a,b on the central section 120 and sensors 113c,d on each of the wing sections 122a,122b, 124a,124b) after leveling (e.g., process Steps 1-3 discussed above) may be compared to a target frame height. If the obtained measurements are within range of the target frame height, no adjustments are made. If the frame 102 is too high, the common lift/lower circuit is adjusted by the controller 116 and hydraulic valves to lower the frame height through the multiple hydraulic actuators 106a in the circuit. If the dimension is too low, the controller 116 and valves operate to raise the frame height through the multiple hydraulic actuators 106a in the circuit. Such hydraulic actuators 106a may include actuators associated with depth-adjustable wheels 104 (e.g., gauge wheels) configured to raise and lower the wheels 104 with respect to the frame 102 of the tillage implement so as to raise and lower the frame 102 with respect to the ground.

Ground Residue and Temperature Sensing

Again, the sensors 113,114,115 can be used to determine levelness and quality of finish behind the implement and/or implement tools, as well as determine proportion of plant residue left covering the soil. Such sensors may comprise time-of-flight cameras or other vison-related sensors. The sensors 113,114,115 are coupled to the controller 116 (see FIG. 14) and may be used to obtain information and to provide feedback to the controller 116 for initiating adjustments of one or more of the following implement operating parameters: disk gang angle; inner wing weight transfer hydraulic pressure; outer wing weight transfer hydraulic pressure; primary lift cylinder height position; fore-aft levelling linkage hydraulic cylinder position; and rear attachment down/up force hydraulic cylinder pressure (and direction).

Turning to FIGS. 9B-10B and 12, the residue sensors 114 are generally configured and positioned as ground residue sensors. In preferred embodiments of the present invention, one or more of the residue sensors 114 may comprise a time-of-flight camera. The time-of-flight camera may use monochromatic illumination and/or multi-wavelength illumination. The time-of-flight camera may operate in the UV spectrum, the infrared spectrum, and/or in the visible spectrum. A preferred camera may use LED light sources and/or LASER light sources. A preferred camera may also include photo-detection elements.

Embodiments of the present invention may, additionally or alternatively, have time-of-flight sensors 114 that include LiDAR sensors, radar sensors, ultrasonic sensors, and/or sonar sensors.

The sensors 114 are preferably configured to identify actual residue coverage of plant material on the soil. In the depicted embodiment, the sensors 114 are generally located along the back end 120b and preferably comprise one or more rearward-facing sensors to capture images of the ground as tilling operations are performed. Although the sensors 114 are depicted as being located forwardly of the finishing reels, preferred embodiments of the invention may have the sensors located directly above or rearwardly of the finishing reels so that the sensors 114 may image a part of the field where the implement has completed its pass. Furthermore, it is within the scope of the present invention for the sensors 114 to be located at other positions relative to the main frame 102.

The sensors (e.g., cameras) are configured to take visual images showing different colors of the plant residue and/or soil. In some embodiments, the sensors may be in the form of time-of-flight cameras configured to determine distance to ground.

The pixels from the time-of-flight images may be analyzed (e.g., reviewed based on color) by the controller 116. Pixels showing a range of distance and color appropriate for soil can be identified as soil. Pixels showing a different range of color or range of distance not appropriate for soil can be identified as residue.

As noted above, soil condition parameters may be determined from camera images using: (i) human crafted, traditional machine vision algorithms, and (ii) deep-learning, neural network methods of computer-optimized algorithms for object detection.

The ratio of residue pixels vs soil pixels can be used (e.g., analyzed by the controller 116) to determine the percent of residue coverage on the ground (i.e., the percent of ground coverage). The controller 116 may then be configured to adjust gang angle and depth settings of ground-engaging tools (such as the gangs of coulter blades) to attempt to achieve the target proportion of residue coverage (within the limits of machine capability and existing residue levels).

Image capturing, image processing, and tool control/ adjustment may be performed by the controller 116 several times each minute to facilitate average processing/measurements and control for improved accuracy. Such operation may permit adjustment of the tillage implement 100 in response to changing soil and residue conditions in different regions of the field.

Turning to FIGS. 9B-10B and 12, for quality of work analysis, embodiments of the present invention may also include temperature sensors 115*a,b* to measure temperature of the ground G (e.g., by taking a temperature image of the soil).

The temperature sensors 115*a* are configured to measure temperature of the ground (e.g., by taking a temperature image of the soil) along the front end 120*a* of the implement 100. One or more sensors 115*a* may include a thermal camera (such as an infrared (IR) camera) positioned along the front of the implement 100 and are preferably forward facing. The sensors 115*a* are preferably forward-looking and configured to collect a temperature image of the ground G before the tillage implement 100 makes its pass.

Temperature sensors 115*b* may be located along the back end 120*b* of the implement 100. One or more sensors 115*b* may include a thermal camera (such as an infrared (IR) camera) positioned along the rear of the implement 100 and are preferably rearward facing.

Because residue generally acts as an insulator, the soil temperature with a residue covering is generally less than the soil temperature of bare ground. This temperature difference can be used to estimate surface residue level. It will be appreciated by those of ordinary skill in the art that soil temperature varies with depth, such that the soil is cooler (spring) or warmer (fall) 2 inches deep vs on the surface. Such a temperature variance permits an evaluation of how well the soil is tilled and mixed.

After the tillage pass, it is preferable to observe a uniform, blended temperature image with many small dots of different temperatures finely mixed. If data from the sensors 115*b* illustrates clusters of similar temperatures bunched together in large blobs or groups, it may be inferred that tilling operations are leaving clods or chunks of soil that did not break apart. The controller 116 is preferably configured to analyze thermal images from the sensors 115*b* to identify such clusters or to otherwise determine a tillage quality of ground after the tillage implement has made a pass over the ground.

Embodiments of the invention may use the sensors 115*b* to determine a tillage depth after the tillage implement 100 has made a pass over the ground. In particular, the sensors 115*b* may be used to estimate how deep the implement is tilling by measuring soil temperature and using soil temperature data as a calibration factor. The higher temperature gradient that shows up in the image, the deeper the implement is tilling. If reference temps for specific depths are available, embodiments can calibrate to that reference temperature and use that as a true depth measurement when compared to our tilled soil image. The controller 116 is preferably configured to analyze thermal images from the sensors 115*b* to identify temperature gradients in the image and thereby determine a tillage depth after the tillage implement 100 has made a pass over the ground.

It will be understood that temperature sensors, such as sensors 115*b*, may require calibration. Constant calibration of a thermal image sensor may be accomplished by providing a second sensor to obtain temperature readings at a specified depth.

An operation step of the implement 100 involves adjustment of the depth to achieve target residue coverage, governed by operator set limits and machine capability (referred to herein as "Step 5"). As noted, embodiments may include rear facing cameras configured to capture images of the soil after a pass of the tillage implement 100 over a section of soil is complete. These images can be processed to determine the actual residue coverage on the soil. This actual residue value can be compared to a target residue value (e.g., such as may be set the operator). If the actual value is too high, the control system can adjust the overall height of the tillage implement to the ground (as described in Step 4 above) to increase the operating depth of the ground-engaging tools to work deeper into the soil to cover more residue. In contrast, if the actual residue value is too low, the control system may adjust the overall height (again, as described in Step 4 above) to decrease the operating depth, positioning the ground-engaging tools to a lesser extent into the soil. This adjustment may be restricted by operator choice as they will be able to specify a weighting preference of uniform depth over all of the field versus target residue coverage over all of the field. This is more likely to be the case in the spring when preparing the field ahead of planting, where a uniform depth ahead of the planter will take priority over a uniform residue level. The reverse is more likely in the fall when getting a uniform residue level can be the higher priority.

An operation step of the implement 100 involves adjustment of gang angle to achieve a percent residue coverage target, governed by operator set limits and machine capability (referred to herein as "Step 6"). The same principles as Step 5 may be applied with respect to the controller 116 adjusting the gang angle of the ground-engaging tools. The difference is that, rather than adjust the implement height embodiments, the coulter/disc gang angles are adjusted. The gangs may be adjusted to increase the gang angle, in order to bury more residue, or decrease the gang angle, to bury less residue.

An operation step of the implement 100 involves readjustment of the machine level as needed for depth or gang angle adjustments, which may include fore-and-aft leveling and/or side-to-side leveling (this readjustment step is referred to herein as "Step 7"). When the implement depth or the gang angle are adjusted, such changes may affect the machine leveling behavior. As the gang angle is increased or decreased, the front coulter blades do more or less work relative to the rear coulter blades and have more or less tendency to go into the ground G. The resistance to going into the ground G seen by the wing sections can also increase or decrease in total force required. These effects may require a readjustment of machine level in the fore-and-aft direction (see Step 1 above) and/or in a side-to-side direction (see Steps 2 and 3 above) after changes to depth or gang angle. Subsequent to leveling, readjustment may also require adjustment of the overall height of the tillage implement frame 102 (see Step 4), adjustment of depth (see Step 5), and/or adjustment of gang angle (see Step 6). Thus, Steps 1-6 can be repeated continuously, as needed, during operation of the tillage implement 100 through the section of field.

The finishing attachment position and/or down force may also be adjusted to achieve desired results, although it is more commonly used to achieve a target levelness than a target residue level.

The control system and the sensors are configured to achieve multiple objectives or target settings for tillage outcomes, such as sensing and controlling of levelness, uniform depth, uniform and desired residue level, desired surface moisture level, temperature gradient, clod size, etc. Adjustments to implement operating parameters (such as depth, gang angle, front/rear level, etc.) may affect multiple target parameters, and the implement preferably enables the operator to prioritize the target parameters and set limits on the target parameters, while the controller conducts a procedure of making adjustments and observing tillage outcome results to determine the best set of values to achieve the desired outcomes.

User Interface Settings and Parameters

The tillage implement 100 also preferably includes a user interface 150 (see FIG. 14) operably coupled to the controller 116 and configured to display one or more soil condition parameters to an operator of the tillage implement 100. Similar to the previous embodiment, an alert may be displayed to the operator (e.g., via the user interface 150) if a soil condition parameter exceeds a corresponding target parameter value or range.

The user interface 150 is also operable to receive target settings for tillage outcomes produced by operation of the tillage implement 100. In preferred embodiments, the user interface 150 may be positioned within a cab of a tow vehicle used to advance the tillage implement 100.

The target settings associated with the tillage implement 100 may include target settings for operating depths of ground-engaging tools, target settings for residue coverage, target settings for gang angles of ground-engaging tools, and/or other target settings associated with implement operation. The user interface 150 may also be configured to generate a map for inputting target settings in association with specific locations and/or areas of a field. In such embodiments, the map may comprise a GPS prescription map that includes geolocation information received from a GPS system. Data from rear-facing sensors (such as sensors 114,115*b*) may be used to adjust GPS prescription map settings.

Preferably, the control system is operable to have the operator input target settings (for instance, via the user interface 150) for tillage outcomes and/or prioritize the tillage outcomes, where the target settings may include at least one of target depth, target residue level/coverage, target soil levelness, target soil clod size, target implement level value, target soil moisture, and target temperature gradient. The preferred control system is also operable to have the operator input limits on implement parameters and/or prioritize the implement parameters (which may be done via the user interface 150), wherein the implement parameters include at least one of implement speed, actual level value, actual depth, and gang angle.

In preferred embodiments, the controller 116 is preferably configured to prioritize and/or adjust one or more of the implement parameters to obtain one or more of the tillage outcomes. In one example, residue level produced by an implement pass may be affected by the implement parameters of speed, fore/aft level, depth and gang angle. If the operator selects a maximum depth (such as 2.5 inches), the controller 116 will preferably adjust the depth no deeper than the maximum depth setting (2.5 inches), while adjusting one or more other implement parameters to achieve the target tillage outcome. For instance, to obtain the target residue level without exceeding the maximum depth setting, the controller 116 may limit the implement depth while also increasing the gang angle, changing the implement speed, and/or adjusting the implement fore/aft level deeper in the front of the implement.

In another example, soil levelness produced by an implement pass may be affected by the implement parameters of speed, fore/aft level, depth and gang angle. Preferably, the controller 116 operates according to implement parameter limits set by the operator to adjust one or more implement parameters for obtaining the target soil levelness. While obtaining the target soil levelness, the controller 116 is also preferably obtaining the target residue level as well. To maintain both target soil levelness and target residue level, it may be necessary for the controller 116 to adjust multiple implement parameters.

Again, the controller 116 is also preferably configured so that the operator can prioritize the tillage outcomes relative to each other. The control system is preferably operable to have the operator input a priority value for each tillage outcome (e.g., via the user interface 150). For instance, the control system may permit the operator to prioritize target residue level over target soil levelness. Conversely, the operator can prioritize the target soil levelness over target residue level.

If the controller 116 is unable to maintain multiple tillage outcomes at the same time (such as target soil levelness and target residue level), the controller 116 preferably will prioritize obtaining the highest priority tillage outcome, while attempting to reach one or more lower priority tillage outcomes. For instance, if target residue level is set to have the highest priority, the controller will prioritize obtaining the target residue level relative to the target soil levelness. The controller may also notify the operator (e.g., via the user interface 150) that one or more tillage outcomes have not been reached and may recommend additional actions to achieve the outcomes.

In addition to the map generated by the user interface 150, the target settings may be developed based upon soil data, such as organic matter, soil type, previous crop yields, terrain, slope percentage, and/or moisture.

Embodiments of the tillage implement 100 may include sensors to detect and measure soil condition parameters. For instance, one or more sensors 113,114,115 may be configured to measure the amount of crop/plant residue on the ground G and/or the smoothness/roughness value of the ground G. Preferably, the operator may select (e.g., via the user interface 150) a desirable level of soil roughness and residue reduction. Embodiments of the present invention may provide a means to measure and alert the operator (e.g., via the user interface 150) if tillage equipment settings are meeting the intended targets. Embodiments of the invention may employ first and second derivative analysis of sensor data to determine surface smoothness, roughness, and quality of work.

Depth map data may be used by embodiments of the tillage implement 100 for measuring soil condition parameters (which may be relevant to subsequent crop planting). For instance, the tillage implement 100 is preferably configured to measure changes in soil condition associated with manual or automated adjustments to the implement 100.

Additionally, the user interface 150 may permit the operator to manually override any target settings to obtain a desired or target outcome. Based upon manual adjustment of target settings and/or machine parameters, the implement 100 may be configured to then collect new sensor data, associated with the manual adjustments, and develop new target settings based upon the new sensor data. The user interface 150 may then permit the operator to accept the new target settings for maintaining the desired or target outcome.

Embodiments of the implement 100 may be configured to compare tillage results to target settings and then recommend a GPS-based follow-up action to the operator if the tillage results did not meet the desired targets or goals. For instance, a recommendation may be provided by the implement 100 to perform a second pass with the same implement tool to further reduce residue or roughness if a target was not achieved in a first pass. Additionally, the implement 100 may recommend using an alternative tool that is different than the current tool (e.g., where the alternative tool is a more aggressive tool or a less aggressive tool) to achieve a target outcome in one pass. One example of a recommended tool switch may involve switching from a disc harrow to a field cultivator.

In instances where the implement 100 recommends performing a second pass with the same implement tool, the implement 100 may be configured to perform the second pass in an autonomous operation. Although the autonomous second pass may be conducted along the entire field, it is within the ambit of the present invention for the implement 100 to perform the second pass along only one or more parts of the field.

For instances where the implement 100 recommends a GPS-based local secondary operation, the implement 100 may be configured to perform the secondary operation with a second autonomous tool, and which may be performed at a later time. However, the principles of the present invention are also applicable for the implement 100 to communicate the secondary operation recommendations to a second implement before or substantially at the same time of completion of the primary operation by the implement 100. For instance, where both implements are operating in the same field, communication between the implements may allow the primary and secondary operations to be performed and/or completed for the overall field at the same time.
Controller The controller 116 is operable to sense and control the height of the tillage implement 100 and is also operable to control the tillage implement associated with measured soil condition.

As described in the previous embodiment, the controller 116 and user interface 150 are preferably provided as part of a computing device. As explained in detail above, the computing device may include one or more processors and memory elements.

As previously noted, the depicted controller 116 is configured to receive height information from the front and rear sensors 113*a,b*. For instance, the controller 116 preferably provides instructions to the leveling assembly 108 to adjust the front-to-rear orientation of the central section 120 based on the received height information. Again, the height values for the front and rear sensors 113*a*,113*b* are preferably compared with each other by the controller 116 to determine a difference between the values. If the difference is outside a target level range, the controller 116 will preferably send a signal to extend or retract the hydraulic actuator 106*d*.

The controller 116 is also configured to receive height information from sensors 113*a*,113*c*,113*d* to level frame sections of the tillage implement 100 from side to side. Preferably, the controller 116 is configured to compare the front height value from the front sensor 113*a* of the central section 120 and the height values from the sensors 113*c*,*d* of the wing sections 122*a*,122*b*,124*a*,124*b* to determine an actual (i.e., measured) side-to-side level value of the main frame 102.

The controller 116 is also preferably configured to receive a design target side-to-side level value and/or target level range. Furthermore, the controller 116 is operable to compare the actual side-to-side level value with the target level value or target level range. If a side-to-side level difference is outside a target level range, the controller 116 will preferably send a signal to extend or retract the corresponding hydraulic actuator 106*a,b,c*. Matching of side-to-side level difference preferably includes the inner wing sections 122*a*,124*a* matching the central section 120, and then the outer wing sections 122*b*,124*b* matching the inner wing sections 122*a*,124*a*.

As discussed above, the controller 116 is configured to increase or reduce pressure to the hydraulic actuators 106*b*, 106*c* when the heights of one or more wing sections 122*a*, 122*b*,124*a*,124*b* need to be adjusted (e.g., because a side-to-side level difference is outside a target level range).

The controller 116 is also operable to analyze images obtained from the sensors 113,114,115 to determine actual residue coverage of plant material on the soil. Preferably, the controller is also configured to compare the actual (measured) residue coverage with a target residue coverage.

If the actual residue coverage is greater than the target residue coverage, the controller 116 is configured to lower at least part of the main frame 102 of the tillage implement 100 so as to increase an operating depth of corresponding ground-engaging tools of the tillage implement 100. Additionally or alternatively, if the actual residue coverage is less than the target residue coverage, the controller 116 may be configured to increase a gang angle of ground-engaging tools of the tillage implement.

Similarly, if the actual residue coverage is less than the target residue coverage, the controller 116 is configured to raise at least part of the main frame 102 of the tillage implement 100 so as to decrease an operating depth of corresponding ground-engaging tools of the tillage implement 100. Additionally or alternatively, if the actual residue coverage is less than the target residue coverage, the controller 116 is configured to decrease a gang angle of ground-engaging tools of the tillage implement 100.

The controller 116 is also configured process the information obtained by the time-of-flight sensors 113,114,115 to generate one or more soil condition parameters. Embodiments of the controller 116 are also configured to automatically control operation of one or more components of the tillage implement 100 based on the one or more soil quality parameters.

For instance, the controller 116 may automatically control operation of the tillage implement 100 by adjusting a speed of the tillage implement 100 and/or adjusting a position of the ground-engaging tools of the tillage implement 100. Examples of adjusting a position of the ground-engaging tools includes shifting a depth at which the ground-engaging tools are embedded in the ground and/or shifting a gang angle of the ground-engaging tools. When shifting the depth of ground-engaging tools, it is within the scope of the present invention for all tools on the implement, or a partial group of tools, to be shifted with one another. However, multiple tools may be shifted separately from each other to permit depth adjustments of each tool independently of the other tools.

Adjusting the position of a ground-engaging tool may also involve adjusting a shank angle relative to the ground. Shanks that are rolled forward in the direction of travel tend to pull deeper and those rolled rearwards at the top tend to float up out of the soil. These tendencies are primarily caused by the angle of attack of the sweep or point running in the soil. In another example of the present invention, a chisel implement may be adjusted by moving the front cutting blades deeper or shallower, while maintaining the shanks at a constant depth, to make a corresponding change to the residue level.

Embodiments of the controller 116 may be configured to display one or more soil condition parameters to an operator (e.g., via the user interface 150). Furthermore, the controller 116 may generate an alert if the soil condition parameters exceed a soil condition target parameter.

The controller 116 may also be configured to generate depth maps based on the time-of-flight images after the tillage implement 100 makes a pass across the ground. The depth maps may comprise a matrix of depth values corresponding to pixels of the time-of-flight images. The controller 116 may use the matrix to identify objects and distances between objects. The controller 116 may also use the matrix to sense and control for moisture level, residue level, temperature gradient, clod size, etc.

Although the present invention has been described in detail, it should be understood that various changes, substitutions and alterations can be made thereto without departing from the spirit and scope of the invention as defined by the appended claims.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A non-transitory computer-readable medium with a computer program stored thereon for controlling a tillage implement, wherein when executed by one or more processors the computer program instructs the one or more processors to perform the following steps:

receive, via a user interface, one or more target settings for soil conditions;

obtain, via one or more sensors, information indicative of one or more soil condition parameters of the ground, wherein the one or more sensors comprise a time-of-flight sensor;

generate soil condition parameters based on the information indicative of the one or more soil condition parameters;

compare the soil condition parameters with the target settings; and adjust operating characteristics of the tillage implement based on the comparison between the soil condition parameters and the target settings.

2. The non-transitory computer-readable medium of claim 1, wherein the one or more target settings are selected from one or more of the following: target soil depth, target residue level, target soil levelness, target soil clod size, target soil moisture, and target soil temperature gradient.

3. The non-transitory computer-readable medium of claim 1, where the one or more sensors comprise a time-of-flight sensor.

4. The non-transitory computer-readable medium of claim 1, where the one or more sensors comprise a time-of-flight sensor with at least one or more additional sensors.

5. The non-transitory computer-readable medium of claim 4, where the one or more additional sensors comprises an RGB camera or a temperature sensor.

6. The non-transitory computer-readable medium of claim 4, where the one or more additional sensors comprises a LiDAR sensor, a radar sensor, an ultrasonic sensor, and/or a sonar sensor.

7. The non-transitory computer-readable medium of claim 1, wherein the one or more soil condition parameters are selected from one or more of the following: soil roughness and residue coverage.

8. The non-transitory computer-readable medium of claim 7, where the soil condition parameters are generated based on machine vision algorithms and/or neural networks.

9. The non-transitory computer-readable medium of claim 1, wherein when executed by the one or more processors the computer program instructs the one or more processors to perform the following additional step:

generate an alert upon at least one of the one or more soil condition parameters falling outside of a target setting value or range.

10. The non-transitory computer-readable medium of claim 1, wherein when executed by the one or more processors the computer program instructs the one or more processors to perform the following additional steps:

generate a recommendation to perform an additional pass over all or part of the ground with the tillage implement.

11. The non-transitory computer-readable medium of claim 10, wherein the recommendation includes a recommendation to perform the additional pass using a different tool associated with the tillage implement.

12. The non-transitory computer-readable medium of claim 1, wherein the tillage implement includes one or more ground engaging tools, wherein said step of adjusting operating characteristics of the tillage implement includes:

automatically adjusting a position of the one or more ground-engaging tools.

13. The non-transitory computer-readable medium of claim 12, wherein said step of automatically adjusting a position of the one or more ground-engaging tools includes automatically adjusting angles of the one or more ground-engaging tools.

14. The non-transitory computer-readable medium of claim 12, wherein said step of automatically adjusting a position of the one or more ground-engaging tools includes automatically adjusting operating depths the one or more ground-engaging tools.

15. The non-transitory computer-readable medium of claim 12, wherein said step of automatically adjusting a position of the one or more ground-engaging tools includes automatically adjusting down forces of the one or more ground-engaging tools.

16. The non-transitory computer-readable medium of claim 12, wherein the one or more ground-engaging tools include coulter blades.

17. The non-transitory computer-readable medium of claim 12, wherein the one or more ground-engaging tools include harrow assemblies.

18. The non-transitory computer-readable medium of claim 12, wherein the one or more ground-engaging tools include finishing reels.

19. The non-transitory computer-readable medium of claim 12, wherein the one or more ground-engaging tools include multiple tools that are separately adjustable from each other.

20. The non-transitory computer-readable medium of claim 19, wherein the multiple tools are different types of tools.

21. The non-transitory computer-readable medium of claim 19, wherein the multiple tools are the same type of tool.

22. The non-transitory computer-readable medium of claim 19, wherein the multiple tools include tools set apart laterally from each along a width of the implement.

23. The non-transitory computer-readable medium of claim 12, wherein the tillage implement includes a frame, and wherein said step of automatically adjusting a position of the one or more ground-engaging tools includes automatically adjusting a position of the frame.

24. The non-transitory computer-readable medium of claim 23, wherein the step of automatically adjusting a position of the frame includes adjusting the frame so that the frame is not level with respect to the ground.

25. The non-transitory computer-readable medium of claim 1, wherein said step of adjusting operating characteristics of the tillage implement includes automatically adjusting a speed of the tillage implement.

26. An agricultural system comprising:

a tillage implement including at least one ground-engaging tool;

one or more sensors configured to obtain information indicative of soil condition parameters;

a user interface; and a controller comprising a processing element and a memory element, wherein the controller is configured to:

receive, via the user interface, one or more target settings for soil conditions;

obtain, via the one or more sensors, information indicative of one or more soil condition parameters of the ground;

generate soil condition parameters based on the information indicative of the one or more soil condition parameters;

compare the soil condition parameters with the target settings; and adjust operating characteristics of the tillage implement based on the comparison between the soil condition parameters and the target settings.

\* \* \* \* \*